United States Patent
Izuhara et al.

(10) Patent No.: US 7,800,835 B2
(45) Date of Patent: Sep. 21, 2010

(54) ZOOM LENS AND IMAGE PICKUP DEVICE

(75) Inventors: Isamu Izuhara, Osaka (JP); Hiromichi Nose, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/453,235

(22) Filed: May 4, 2009

(65) Prior Publication Data
US 2009/0290227 A1    Nov. 26, 2009

(30) Foreign Application Priority Data
May 26, 2008   (JP) .............................. 2008-137105

(51) Int. Cl.
*G02B 15/14* (2006.01)
(52) U.S. Cl. .................................... 359/691
(58) Field of Classification Search ............... 359/691
See application file for complete search history.

(56) References Cited

U.S. PATENT DOCUMENTS 6,025,961 A * 2/2000 Kohno et al. ............... 359/691

FOREIGN PATENT DOCUMENTS

JP    2002-072091    3/2002

* cited by examiner

*Primary Examiner*—William C Choi
(74) *Attorney, Agent, or Firm*—Rader, Fishman & Grauer PLLC

(57) ABSTRACT

A zoom lens includes a first lens group having negative refractive power and a second lens group having positive refractive power, each including at least one plastic aspherical lens. The zoom lens satisfies the following Conditional Expressions (1) and (2), (1) $0.40<fw/bkw<0.60$; (2) $0.01<|(X1-X0)/h0|<0.022$, where fw: focal length of the entire zoom lens in focus at infinity in a wide-angle end state; bkw: back focus when the entire zoom lens is in focus at infinity in the wide-angle end state; X1: thickness at an image-side effective diameter position of the plastic aspherical lens of the first lens group; X0: thickness at the center of the plastic aspherical lens of the first lens group; and h0: image-side effective radius of the plastic aspherical lens of the first lens group.

9 Claims, 21 Drawing Sheets

ZOOM LENS AND IMAGE PICKUP DEVICE

BACKGROUND OF THE INVENTION

1. Field of the Invention

The present invention relates to a zoom lens and an image pickup device. More particularly, the present invention relates to the technical field of a zoom lens suitable for an interchangeable lens mountable to a digital single-lens reflex camera, having high performance, and capable of providing sufficient back focus; and to the technical field of an image pickup device including the zoom lens.

2. Description of the Related Art

In recent years, in an image pickup device, such as a still camera or a video camera, pixelation of an image pickup element is being increased due to a rapid progress in digitization, so that there is an increasing demand for a zoom lens adaptable to an increase in performance. In addition, there is a high demand for reducing costs, weight, and size, in addition to increasing performance.

To meet such demands, in particular, in a zoom lens that covers a range from a wide-angle area to a medium-telephoto area, for example, an optical system having a two-lens group structure or an optical system having a four-lens group structure are proposed. In the optical system having a two-lens group structure, simplification of its mechanical structure and cost reductions are intended to be achieved. In the optical system having a four-lens group structure, higher performance is regarded as being important.

Optical systems having three-lens group structures for reducing weight and size are also proposed. Such optical systems include, for example, one including a first lens group having a negative refractive power, a second lens group having a positive refractive power, and a third lens group having a positive refractive power in that order from an object side to an image side. (Refer to, for example, Japanese Unexamined Patent Application Publication No. 2002-72091 (Patent Document 1)).

SUMMARY OF THE INVENTION

The zoom lens discussed in Patent Document 1 is based on a specification that is optimal for an image pickup device using a silver salt film. Therefore, the zoom lens is not optimized with respect to recent digitization, as a result of which the zoom lens is not designed for size reduction suitable for a specification provided for digitization.

In addition, in the zoom lens discussed in Patent Document 1, the effect of correcting aberrations by an aspherical surface of a plastic aspherical lens in the first lens group is low, as a result of which the aberrations are not sufficiently corrected.

Further, when the zoom lens is used as an interchangeable lens mountable to a digital single-lens reflex camera, it is necessary to provide sufficient back focus.

It is desirable for a zoom lens and an image pickup device according to embodiments of the present invention to overcome the aforementioned problems, to increase performance and reduce size, and to provide sufficient back focus.

According to an embodiment of the present invention, there is provided a zoom lens including a first lens group having a negative refractive power, and a second lens group having a positive refractive power, wherein the first lens group and the second lens group are disposed in that order from an object side to an image side, wherein, when magnification is changed between a wide-angle end and a telephoto end, the first lens group and the second lens group are moved in a direction of an optical axis, wherein the first lens group and the second lens group each include at least one plastic aspherical lens, and wherein the zoom lens satisfies the following Conditional Expressions (1) and (2), $$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

Therefore, in the zoom lens, various aberrations are properly corrected, and the back focus is optimized.

In the above-described zoom lens, it is desirable that the first lens group include a first lens having a negative refractive power, a second lens having a negative refractive power and being the plastic aspherical lens, and a third lens having a positive refractive power; it is desirable that the first lens, the second lens, and the third lens be disposed in that order from the object side to the image side; and it is desirable the zoom lens satisfy the following Conditional Expressions (3), (4), and (5), $$0.02 < |(X3-X2)/h1| < 0.12 \quad (3)$$

$$-2.0 < f1/fw < -1.7 \quad (4)$$

$$2.3 < fasp1/f1 < 2.8 \quad (5)$$

where X3 represents an air gap at an effective diameter position of an object-side surface of the second lens and the first lens; X2 represents an on-axis air gap at the first lens and the second lens; f1 represents a focal length of the first lens group; h1 represents an effective radius of the object-side surface of the plastic aspherical lens of the first lens group, and fasp1 represents a paraxial focal length of the plastic aspherical lens of the first lens group.

By satisfying the Conditional Expressions (3), (4), and (5), the influence of one side blur at the wide-angle end of the second lens is reduced, and aberrations are properly corrected and the size of the zoom lens is properly reduced.

In addition, in the above-described zoom lens, it is desirable that at least an image side surface of the at least one plastic aspherical lens of the first lens group be an aspherical surface, and that the image-side aspherical surface of the at least one plastic aspherical lens of the first lens group satisfy the following Conditional Expression (6), $$-1.2 < \kappa < -0.6 \quad (6)$$

where κ represents a conic constant in the following Numerical Expression (1), $$x = \frac{ch^2}{1 + \sqrt{1 - (1+\kappa)c^2h^2}} + \sum_{i=2}^{16} A_i h^i$$

where x represents a distance from a vertex of the lens surface in the direction of the optical axis, h represents a height in a direction perpendicular to the optical axis, c represents a paraxial curvature at the vertex of the lens surface, and Ai represents a first-order aspherical coefficient.

By satisfying the Conditional Expression (6), aberrations can be properly corrected, and the size of the zoom lens is properly reduced.

Further, in the above-described zoom lens, it is desirable that the second lens group include a cemented lens having a positive refractive power and the at least one plastic aspherical lens having a positive refractive power, and that the zoom lens satisfy the following Conditional Expression (7), $$\Delta v > 25 \quad (7)$$

where $\Delta v$ represents a difference between Abbe numbers in the cemented lens.

By satisfying the Conditional Expression (7), chromatic aberration can be properly corrected in an entire zoom range.

Still further, in the above-described zoom lens, it is desirable that the at least one plastic aspherical lens of the second lens group satisfy the following Conditional Expressions (8) and (9), $$2.5 < |fasp2/f2| < 35 \quad (8)$$

$$|(X5-X4)/h2| < 0.26 \quad (9)$$

where fasp2 represents a paraxial focal length of the plastic aspherical lens of the second lens group, f2 represents a focal length of the second lens group, X5 represents a thickness at an image-side effective diameter position of the plastic aspherical lens of the second lens group, X4 represents a thickness at the center of the plastic aspherical lens of the second lens group, and h2 represents an image-side effective radius of the plastic aspherical lens of the second lens group.

By satisfying the Conditional Expressions (8) and (9), variations in performance due to temperature change and variations in aberrations due to temperature change are restricted.

Still further, in the above-described zoom lens, it is desirable that focusing be performed by moving the first lens group in the direction of the optical axis.

By performing focusing by moving the first lens group in the optical axis direction, the focusing is performed by the lens group at which aberrations are sufficiently corrected.

Still further, it is desirable that the zoom lens further include an aperture stop disposed in the second lens group.

By disposing the aperture stop within the second lens group, it is no longer necessary to provide a space for disposing the aperture stop between the first and second lens groups.

In addition, it is desirable that the zoom lens further include a light-shielding member for restricting flare disposed at an object-side surface of the second lens group.

By disposing the light-shielding member for restricting flare at the object-side surface of the second lens group, it is possible to cut a lower off-axis light beam in the wide-angle end state.

According to another embodiment of the present invention, there is provided an image pickup device including a zoom lens and an image pickup element that converts an optical image formed by the zoom lens into an electrical signal, wherein the zoom lens includes a first lens group having a negative refractive power and a second lens group having a positive refractive power, wherein the first lens group and the second lens group are disposed in that order from an object side to an image side, wherein, when magnification is changed between a wide-angle end and a telephoto end, the first lens group and the second lens group are moved in a direction of an optical axis, wherein the first lens group and the second lens group each include at least one plastic aspherical lens, and wherein the zoom lens satisfies the following Conditional Expressions (1) and (2), $$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

Therefore, in the image pickup device, various aberrations of the zoom lens are properly corrected, and the back focus is optimized.

The zoom lens according to the embodiment of the present invention includes a first lens group having a negative refractive power and a second lens group having a positive refractive power, wherein the first lens group and the second lens group are disposed in that order from an object side to an image side, wherein, when magnification is changed between a wide-angle end and a telephoto end, the first lens group and the second lens group are moved in a direction of an optical axis, wherein the first lens group and the second lens group each include at least one plastic aspherical lens, and wherein the zoom lens satisfies the following Conditional Expressions (1) and (2), $$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

Therefore, in the zoom lens according to the embodiment of the present invention, it is possible to increase performance and reduce size, and to provide sufficient back focus.

The image pickup device according to the another embodiment of the present invention includes a zoom lens and an image pickup element that converts an optical image formed by the zoom lens into an electrical signal, wherein the zoom lens includes a first lens group having a negative refractive power and a second lens group having a positive refractive power, wherein the first lens group and the second lens group are disposed in that order from an object side to an image side, wherein, when magnification is changed between a wide-angle end and a telephoto end, the first lens group and the second lens group are moved in a direction of an optical axis, wherein the first lens group and the second lens group each include at least one plastic aspherical lens, and wherein the zoom lens satisfies the following Conditional Expressions (1) and (2), $$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

Therefore, in the image pickup device according to the embodiment of the present invention, it is possible to increase performance and reduce size, and to provide sufficient back focus.

BRIEF DESCRIPTION OF THE DRAWINGS

FIG. 2 shows spherical aberration, astigmatism, and distortion at a wide-angle end;

FIG. 6 shows spherical aberration, astigmatism, and distortion at a wide-angle end;

FIG. 10 shows spherical aberration, astigmatism, and distortion at a wide-angle end;

FIG. 14 shows spherical aberration, astigmatism, and distortion at a wide-angle end;

FIG. 18 shows spherical aberration, astigmatism, and distortion at a wide-angle end;

DESCRIPTION OF THE PREFERRED EMBODIMENTS

Figure 1:
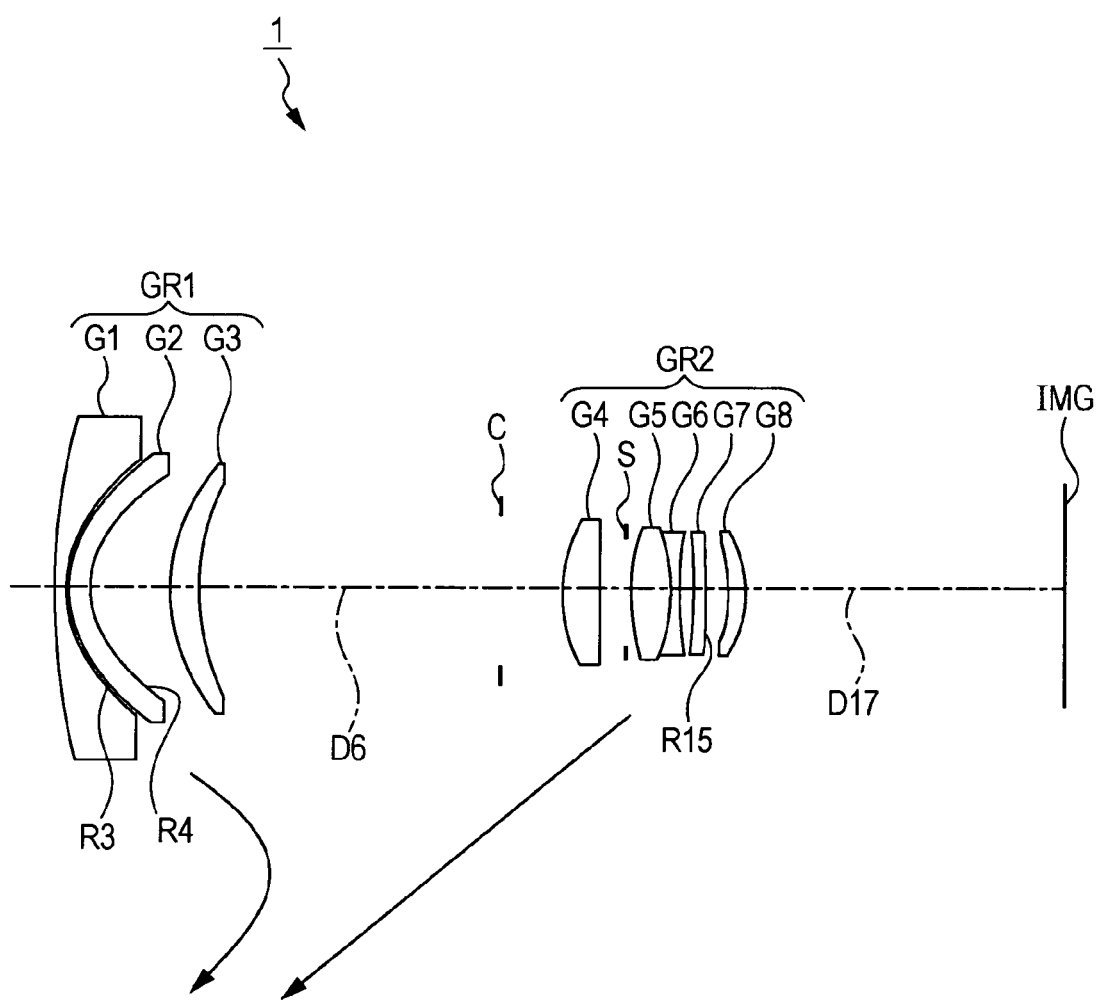
FIG. 1 shows a lens structure of a zoom lens according to a first embodiment of the present invention.

Best modes for realizing zoom lenses and an image pickup device according to preferred embodiments of the present invention will hereunder be described.

First, a zoom lens according to an embodiment of the present invention will be described.

In the zoom lens according to the embodiment of the present invention, a first lens group having a negative refractive power and a second lens group having a positive refractive power are disposed in that order from an object side to an image side. In addition, during a change in magnification between a wide-angle end and a telephoto end, the first and second lens groups are moved in an optical axis direction. Further, the first lens group and the second lens group each have at least one plastic aspherical lens.

Therefore, in the zoom lens according to the embodiment of the present invention, since the first lens group and the second lens group each have at least one plastic aspherical lens, the zoom lens can be reduced in weight.

The zoom lens according to the embodiment of the present invention is formed so that the following Conditional Expressions (1) and (2) are satisfied:

$$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

The Conditional Expression (1) defines the ratio between the focal length and the back focus at the wide-angle end.

When fw/bkw exceeds the upper limit of the Conditional Expression (1), it is difficult to provide the required back focus. In particular, when the zoom lens is used as an interchangeable lens mountable to a digital single-lens reflex camera, the zoom lens may come into contact with a quick return mirror of a camera body. In addition, when fw/bkw exceeds the upper limit of the Conditional Expression (1), the zoom lens may be influenced by shading because an exit pupil position is too close to an image plane.

In contrast, when fw/bkw falls below the lower limit of Conditional Expression (1), the zoom lens can no longer be reduced in size because the back focus becomes too long.

Therefore, when the zoom lens according to the embodiment of the present invention satisfies the Conditional Expression (1), it is possible to provide a required and sufficient back focus and to reduce the influence of shading and the size of the zoom lens. In particular, when the zoom lens is used as an interchangeable lens mountable to a digital single-lens reflex camera, it is possible to prevent the zoom lens and the quick return mirror of the camera body from contacting each other.

The Conditional Expression (2) defines the ratio between the thickness difference and the effective radius. The thickness difference is that between the on-axis thickness of the plastic aspherical lens of the first lens group and the off-axis thickness of the plastic aspherical lens of the first lens group.

When |(X1−X0)/h0| exceeds the upper limit of the Conditional Expression (2), the sensitivity with respect to various aberrations of the plastic aspherical lens becomes too high, and, in particular, it becomes difficult to restriction variations in aberrations based on changes in shape caused by temperature.

In contrast, when |(X1−X0)/h0| falls below the lower limit of the Conditional Expression (2), the refractive power of the plastic aspherical lens becomes too small. Therefore, at the wide-angle side, the effect of correcting distortion and curvature of field is reduced, thereby increasing the diameter of the lens positioned closest to the object side in the first lens group. Therefore, the zoom lens can no longer be reduced in size.

Therefore, when the zoom lens according to the embodiment of the present invention satisfies the Conditional Expression (2), it is possible to properly correct aberrations and to reduce the size of the zoom lens.

In the zoom lens according to the embodiment of the present invention, it is desirable that the first lens group include a first lens having a negative refractive power, a second lens having a negative refractive power and being the plastic aspherical lens, and a third lens having a positive refractive power; it is desirable that the first lens, the second lens, and the third lens be disposed in that order from the object side to the image side; and it is desirable the zoom lens satisfy the following Conditional Expressions (3), (4), and (5), $$0.02 < |(X3-X2)/h1| < 0.12 \qquad (3)$$

$$-2.0 < f1/fw < -1.7 \qquad (4)$$

$$2.3 < fasp1/f1 < 2.8 \qquad (5)$$

where X3 represents an air gap at an effective diameter position of an object-side surface of the second lens and the first lens; X2 represents an on-axis air gap at the first lens and the second lens; f1 represents a focal length of the first lens group; h1 represents an effective radius of the object-side surface of the plastic aspherical lens of the first lens group, and fasp1 represents a paraxial focal length of the plastic aspherical lens of the first lens group.

The Conditional Expression (3) defines the ratio between the length difference and the effective radius of the second lens when the length difference is set. The length difference is obtained by subtracting the difference between the on-axis lengths of the first and second lenses from the difference between the off-axis lengths of the first and second lenses.

When |(X3−X2)/h1| exceeds the upper limit of the Conditional Expression (3), the degree of influence on what is called one-side blurring (in which an image is blurred at one of the left and right sides) at the wide-angle end of the plastic aspherical lens (second lens) is increased. Therefore, it is necessary to provide a flow for adjusting a perpendicular-direction change with respect to the optical axis of an image pickup system.

In contrast, when |(X3−X2)/h1| falls below the lower limit of the Conditional Expression (3), curvature of field and coma aberration can longer be satisfactorily corrected, thereby causing a reduction in performance.

Therefore, when the zoom lens according to the embodiment of the present invention satisfies the Conditional Expression (3), it is possible to reduce the influence of one side blur at the wide-angle end of the second lens.

The Conditional Expression (4) defines the ratio between the focal length of the first lens group and the focal length at the wide-angle end state.

When f1/fw exceeds the upper limit of the Conditional Expression (4), the balance between the Petzval sums of the respective lens groups is lost, thereby making it difficult to correct curvature of field.

In contrast, when f1/fw falls below the lower limit of the Conditional Expression (4), the balance between the Petzval sums of the respective lens groups is lost. This makes it difficult to correct curvature of field and increases an amount by which the first lens group is moved out during focusing, thereby preventing the size of the zoom lens from being reduced.

Therefore, when the zoom lens according to the embodiment of the present invention satisfies the Conditional Expression (4), a good balance between the Petzval sums of the respective lens groups is provided. In addition, it is possible to properly correct aberrations and to reduce the size of the zoom lens.

The Conditional Expression (5) defines the ratio between the focal length of the plastic aspherical lens of the first lens group and the focal length of the first lens group.

When fasp1/f1 exceeds the upper limit of the Conditional Expression (5), the effect of correcting aberrations by the plastic aspherical lens of the first lens group is reduced, and the diameter of the first lens of the first lens group is increased.

When fasp1/f1 falls below the lower limit of the Conditional Expression (5), the influence of a change in shape caused by temperature at the wide-angle side can longer be ignored.

Therefore, when the zoom lens according to the embodiment of the present invention satisfies the Conditional Expression (5), it is possible to properly correct aberrations and to reduce the size of the zoom lens.

In the zoom lens according to the embodiment of the present invention, it is desirable that at least an image side surface of the at least one plastic aspherical lens of the first lens group be an aspherical surface, and that the image-side aspherical surface satisfy the following Conditional Expression (6), $$-1.2 < \kappa < -0.6 \qquad (6)$$

where κ represents a conic constant in the following Numerical Expression (1), $$x = \frac{ch^2}{1+\sqrt{1-(1+\kappa)c^2h^2}} + \sum_{i=2}^{16} A_i h^i$$

where x represents a distance from a vertex of the lens surface in the direction of the optical axis, h represents a height in a direction perpendicular to the optical axis, c represents a paraxial curvature at the vertex of the lens surface, and Ai represents a first-order aspherical coefficient.

The Conditional Expression (6) defines the conical shape of the plastic aspherical lens.

When κ falls below the lower limit of the Conditional Expression (6), the negative refractive power of a peripheral portion of the plastic aspherical lens becomes too weak. Therefore, curvature of field, coma aberration and distortion are excessively corrected, and the diameter of the first lens of the first lens group becomes large.

In contrast, when κ exceeds the upper limit of the Conditional Expression (6), the negative refractive power of the peripheral portion of the plastic aspherical lens becomes too strong. Therefore, off-axis aberration is insufficiently corrected, and sensitivity based on decentering and variations in back focus is increased. Therefore, it becomes difficult to restrict variations in performance caused by decentering of the plastic aspherical lens and temperature change.

Consequently, when the zoom lens according to the embodiment of the present invention satisfies the Conditional Expression (6), aberrations are properly corrected to increase optical performance, and the size of the zoom lens is reduced.

Further, in the zoom lens according to the embodiment of the present invention, it is desirable that the second lens group include a cemented lens having a positive refractive power and the at least one plastic aspherical lens having a positive refractive power, and that the zoom lens satisfy the following Conditional Expression (7), $$\Delta v < 25 \quad (7)$$

where $\Delta v$ represents a difference between Abbe numbers in the cemented lens.

The Conditional Expression (7) defines the difference between the Abbe numbers in the cemented lens.

When $\Delta v$ falls below the lower limit of the Conditional Expression (7), it becomes difficult to correct axial chromatic aberration and chromatic aberration of magnification. In addition, when an attempt is made to properly correct the chromatic aberrations, the other aberrations are increased. Therefore, it becomes difficult to correct these aberrations.

Therefore, when the zoom lens according to the embodiment of the present invention satisfies the Conditional Expression (7), it is possible to properly correct the chromatic aberrations in the entire zoom area.

In the zoom lens according to the embodiment of the present invention, it is desirable that the at least one plastic aspherical lens of the second lens group satisfy the following Conditional Expressions (8) and (9), $$2.5 < |fasp2/f2| < 35 \quad (8)$$

$$|(X5-X4)/h2| < 0.26 \quad (9)$$

where fasp2 represents a paraxial focal length of the plastic aspherical lens of the second lens group, f2 represents a focal length of the second lens group, X5 represents a thickness at an image-side effective diameter position of the plastic aspherical lens of the second lens group, X4 represents a thickness at the center of the plastic aspherical lens of the second lens group, and h2 represents an image-side effective radius of the plastic aspherical lens of the second lens group.

The Conditional Expression (8) defines the ratio between the focal length of the plastic aspherical lens of the second lens group and the focal length of the second lens group.

When |fasp2/f2| exceeds the upper limit of the Conditional Expression (8), it becomes difficult to correct spherical aberration.

When |fasp2/f2| falls below the lower limit of the Conditional Expression (8), the sensitivity with respect to decentering and the back focus of the plastic aspherical lens becomes too high. Therefore, it no longer becomes possible to restrict variations in performance caused by a temperature change.

Therefore, when the zoom lens according to the embodiment of the present invention satisfies the Conditional Expression (8), the variations in performance due to a temperature change are restricted, thereby making it possible to increase optical performance.

The Conditional Expression (9) defines the ratio of the image-side effective radius of the plastic aspherical lens with respect to the difference between the thickness at the center of the plastic aspherical lens and the thickness at the image-side effective diameter position.

When |(X5−X4)/h2| exceeds the upper limit of the Conditional Expression (9), variations in aberrations caused by a temperature change of the plastic aspherical lens are increased.

Therefore, when the zoom lens according to the embodiment of the present invention satisfies the Conditional Expression (9), variations in aberrations caused by a temperature change are restricted, thereby making it possible to increase optical performance.

In the zoom lens according to the embodiment of the present invention, it is desirable that focusing be performed by moving the first lens group in the direction of the optical axis.

By performing focusing by moving the first lens group in the optical axis direction, the focusing is performed by the lens group at which aberrations are sufficiently corrected. Therefore, it is possible to perform focusing in which variations in aberrations are small up to a nearby area.

In the zoom lens according to the embodiment of the present invention, it is desirable that the zoom lens further include an aperture stop disposed in the second lens group.

By disposing the aperture stop within the second lens group, it is no longer necessary to provide a space for disposing the aperture stop between the first and second lens groups. Therefore, it is possible to reduce the size of the zoom lens.

In the zoom lens according to the embodiment of the present invention, it is desirable that the zoom lens further include a light-shielding member for restricting flare disposed at an object-side surface of the second lens group.

By disposing the light-shielding member for restricting flare at the object-side surface of the second lens group, it is possible to cut a lower off-axis light beam at the wide-angle end. This makes it possible to properly correct coma aberration.

Next, zoom lenses according to specific embodiments of the present invention and numerical examples in which specific numerical values are applied to the specific embodiments will be described with reference to drawings and tables.

In each of the tables and the description below, for example, the meanings of the symbols are as follows.

The term "surface number" means an ith surface from the object side. Ri represents the curvature radius of an ith surface counted from the object side to the image side. Di represents an on-axis surface interval between an ith surface and an (ith+1) surface. Ni represents the refractive index at the d-line (wavelength of 587.6 nm) of a material of an ith lens (Gi). vi represents the Abbe number at the d line of the material of the ith lens (Gi). ASP regarding the surface number indicates that the surface is an aspherical surface. ∞ regarding the curvature radius indicates that the surface is a planar surface. Di regarding the on-axis surface interval indicates that the on-axis surface interval is a variable interval.

The lenses used in the numerical examples include those having aspherical surfaces. The shape of each aspherical surface is obtained by the following Numerical Expression (1):

$$x = \frac{ch^2}{1 + \sqrt{1-(1+\kappa)c^2h^2}} + \sum_{i=2}^{16} A_i h^i$$

where x is the distance from a vertex of the lens surface in the optical axis direction, h is the height in a direction perpendicular to the optical axis, c is a paraxial curvature (that is, the reciprocal of the curvature radius) at the vertex of the lens surface, κ is a conic constant, and Ai is a first-order aspherical coefficient.

FIG. 1 shows a lens structure (in a wide-angle end state) of a zoom lens 1 according to a first embodiment of the present invention. Each arrow indicates a path of movement of each lens group along the optical axis towards a telephoto end.

As shown in FIG. 1, the zoom lens 1 according to the first embodiment includes eight lenses.

In the zoom lens 1, when magnification is changed between the wide-angle end and the telephoto end, a first lens group GR1 and a second lens group GR2 are moved in an optical axis direction, and, when focusing is performed, the first lens group GR1 is moved in the optical axis direction.

In the zoom lens 1, the first lens group GR1 having a negative refractive power and the second lens group GR2 having a positive refractive power are disposed in that order from the object side to the image side. The first lens group GR1 and the second lens group GR2 each include at least one plastic aspherical lens.

In the first lens group GR1, a first lens G1 having a negative refractive power, a second lens G2 formed of plastic and having a meniscus shape and a negative refractive power, and a third lens G3 having a meniscus shape and a positive refractive power are disposed in that order from the object side to the image side. A concave surface of the first lens G1 faces the image side and has a high curvature. Both surfaces of the second lens G2 are aspherical surfaces.

In the second lens group GR2, a fourth lens G4 having a positive refractive power, a biconvex fifth lens G5, a biconcave sixth lens G6, a seventh lens G7 formed of plastic and having a positive refractive power, and an eighth lens G8 having a meniscus shape and a positive refractive power are disposed in that order from the object side to the image side. An image-side surface of the seventh lens G7 is an aspherical surface.

The fifth lens G5 and the sixth lens G6 are joined to each other by joining the convex surface of the fifth lens G5 facing the image side and the concave surface of the sixth lens G6 facing the object side, so that a cemented lens having a cemented surface R12 is formed. These convex and concave surfaces have the same curvature radius. The cemented lens has a positive refractive power.

A light-shielding member C that restricts flare is disposed at the object side of the fourth lens G4.

An aperture stop S (aperture surface R10) is disposed between the fourth lens G4 and the fifth lens G5 of the second lens group GR2. The aperture stop S moves along with the second lens group GR2 in the optical axis direction.

Table 1 shows lens data of a first numerical example in which specific numerical values are applied to the zoom lens 1 according to the first embodiment.

TABLE 1

| SURFACE NUMBER | CURVATURE RADIUS Ri | SURFACE INTERVAL Di | REFRACTIVE INDEX Ni | ABBE NUMBER vi |
|---|---|---|---|---|
| 1 | 83.2208 | 1.7000 | 1.7725 | 49.6 |
| 2 | 18.3028 | 0.5748 | | |
| 3 (ASP) | 18.5265 | 2.2000 | 1.529962 | 55.8 |
| 4 (ASP) | 12.1167 | 9.8036 | | |
| 5 | 24.2439 | 3.3268 | 1.846663 | 23.7 |
| 6 | 35.4625 | D6 | | |
| 7 | ∞ | 1.5000 | | |
| 8 | 18.5569 | 4.3840 | 1.51823 | 58.9 |
| 9 | −508.1872 | 3.0000 | | |
| 10 | ∞ | 1.0000 | | |
| 11 | 26.2270 | 4.5698 | 1.496997 | 81.6 |
| 12 | −22.9507 | 1.0000 | 1.834001 | 37.3 |
| 13 | 37.4662 | 1.7579 | | |
| 14 | −133.1549 | 1.4617 | 1.529962 | 55.8 |
| 15 (ASP) | −67.0595 | 2.6193 | | |
| 16 | −28.1119 | 2.0388 | 1.487489 | 70.4 |
| 17 | −15.9169 | | | |

In the zoom lens 1, an object-side surface (R3) of the second lens G2 of the first lens group GR1, an image-side surface (R4) of the second lens G2 of the first lens group GR1, and an image-side surface (R15) of the seventh lens G7 of the second lens group GR2 are aspherical surfaces. Table 2 shows conic constants κ, and 4th-order, 6th-order, 8th-order, and 10th-order aspherical coefficients A4, A6, A8, and A10 of the aspherical surfaces in the first numerical example.

In Table 2 and each table below showing aspherical coefficients, "E-i" is an exponential expression which is to base 10, that is, it expresses "10-i." For example, 0.12345E-05 represents $0.12345 \times 10^{-5}$.

TABLE 2

| SURFACE NUMBER | κ | A4 | A6 | A8 | A10 |
|---|---|---|---|---|---|
| 3 | 0.0000 | $0.34217 \times 10^{-4}$ | $-0.31163 \times 10^{-6}$ | $0.12238 \times 10^{-8}$ | $-0.21322 \times 10^{-11}$ |
| 4 | −0.8204 | $0.51410 \times 10^{-4}$ | $-0.44479 \times 10^{-6}$ | $0.19674 \times 10^{-8}$ | $-0.40118 \times 10^{-11}$ |
| 15 | 0.0000 | $0.60513 \times 10^{-4}$ | $0.17083 \times 10^{-6}$ | $-0.57691 \times 10^{-9}$ | $0.10419 \times 10^{-10}$ |

In the zoom lens 1, when magnification is changed from the wide-angle end state to the telephoto end state, a surface interval D6 between the first lens group GR1 and the second lens group GR2 is changed. Table 3 shows F-numbers Fno, and variable intervals at the wide-angle end state (focal length f=18.5), an intermediate focal-length state (focal length f=31.52), and the telephoto-end state (focal length f=53.5) for surface intervals in the first numerical example.

TABLE 3

| | f | | |
|---|---|---|---|
| | 18.5 | 31.52 | 53.5 |
| Fno | 3.59 | 4.59 | 5.75 |
| D6 | 42.3200 | 17.6311 | 3.218733 |

Figure 2:
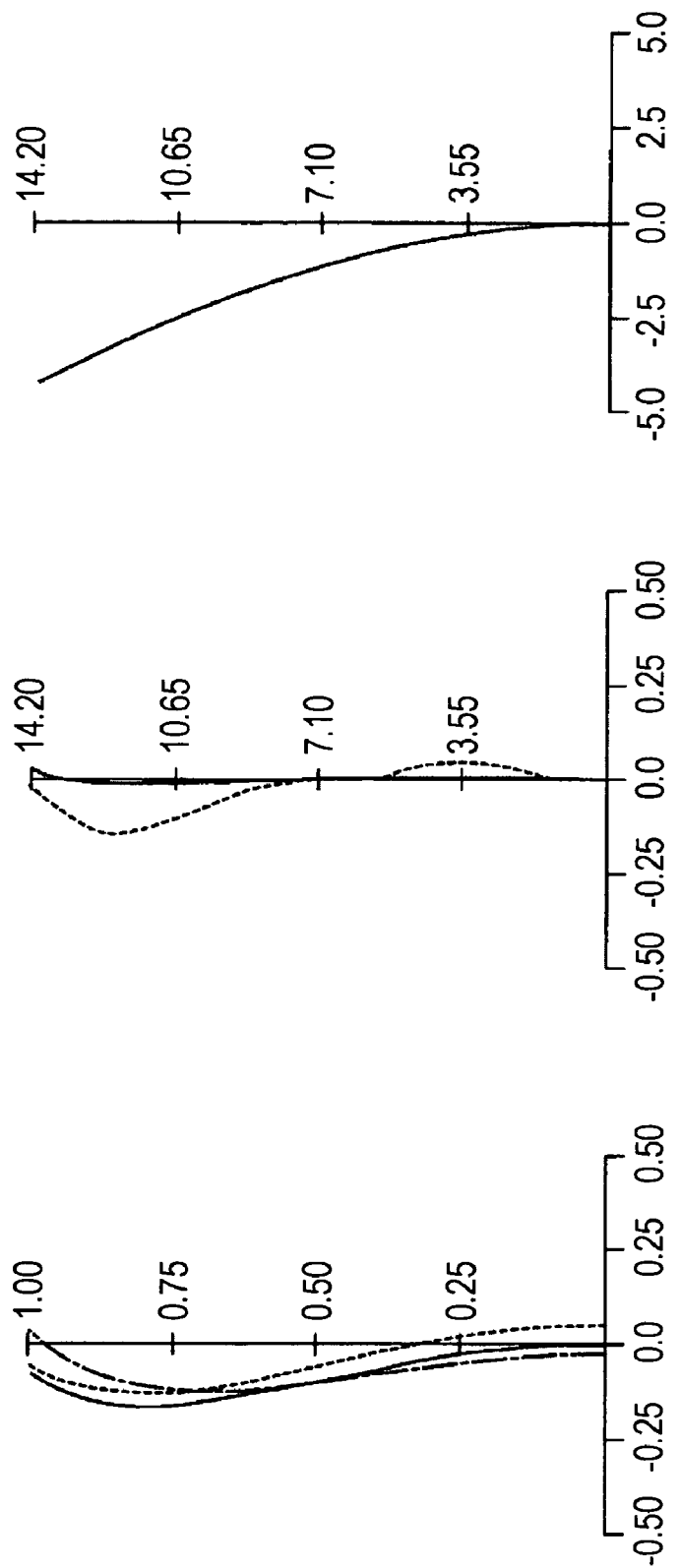
FIG. 2 shows, along with FIGS. 3 and 4, aberrations in a first numerical example in which specific numerical values are applied to the first embodiment.
Figure 3:
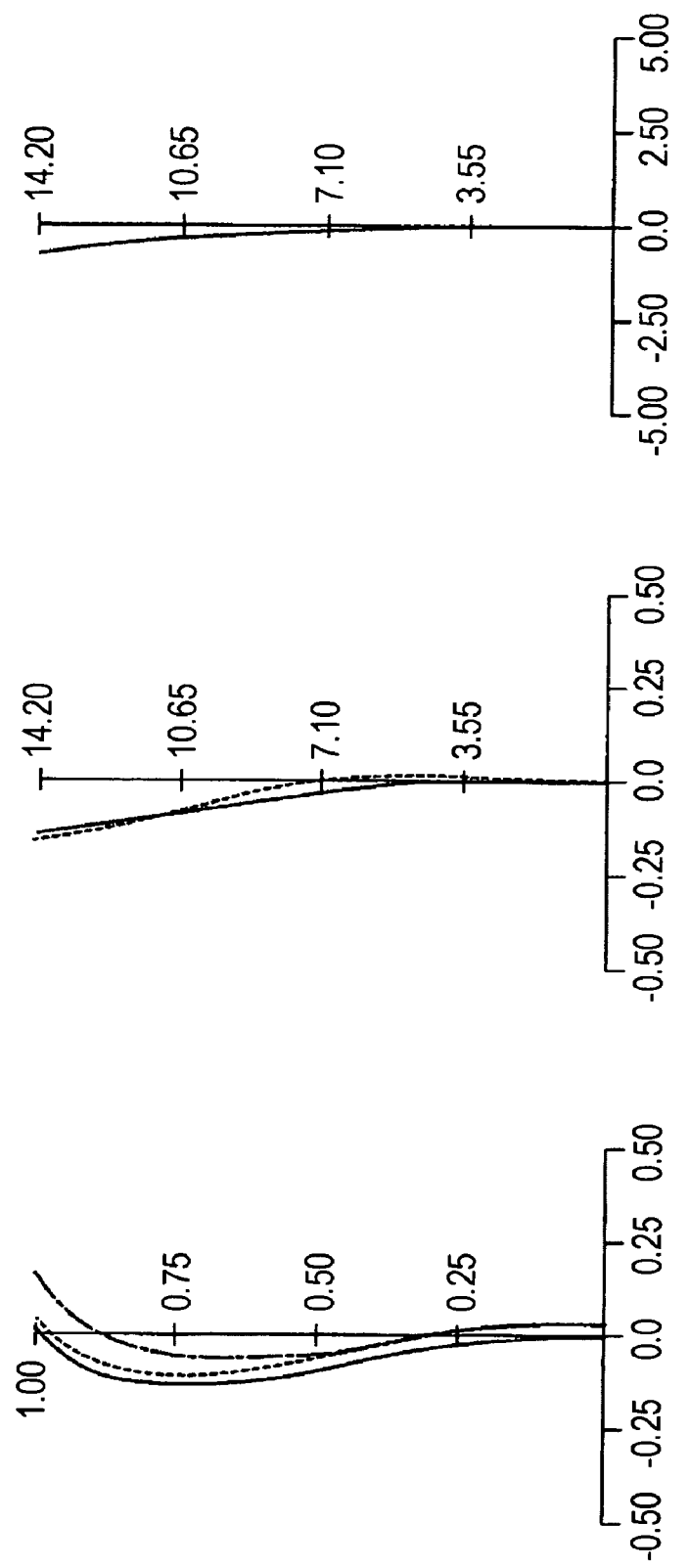
FIG. 3 shows spherical aberration, astigmatism, and distortion at an intermediate focal length.
Figure 4:
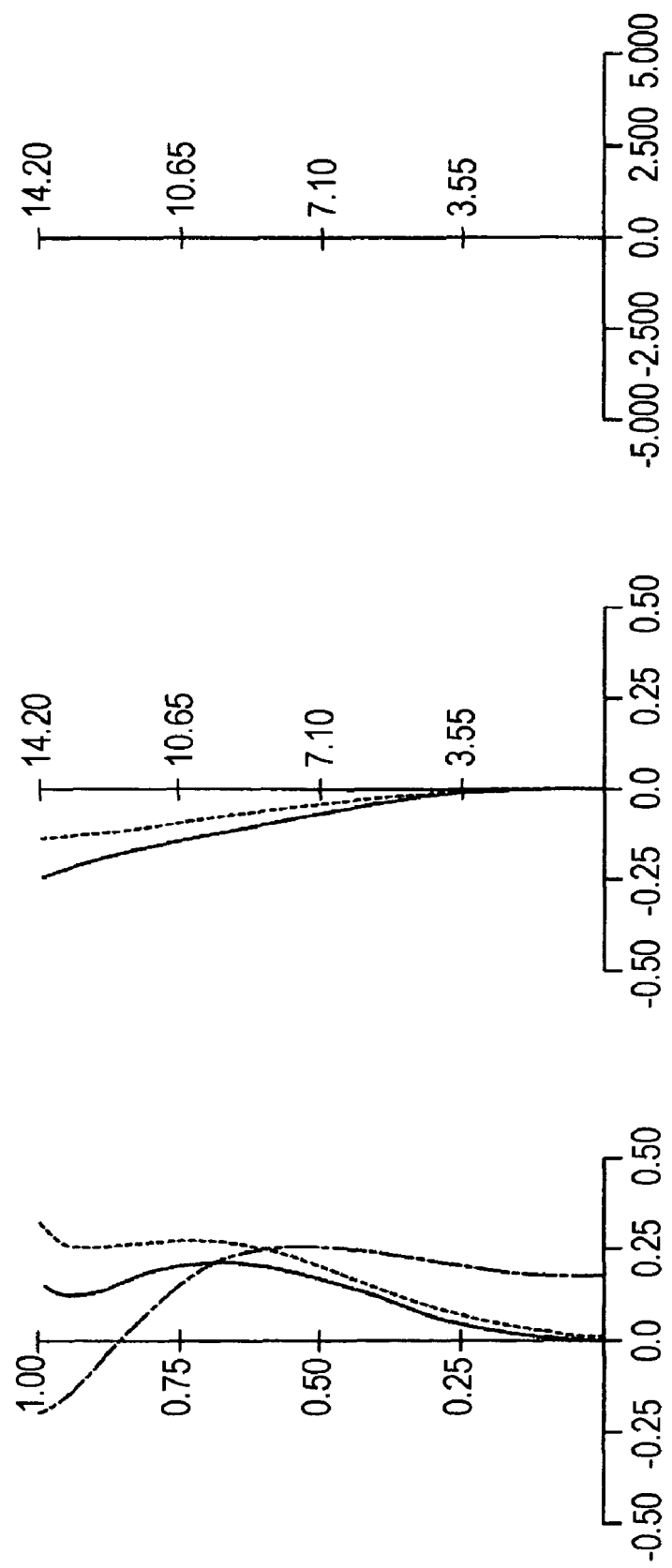
FIG. 4 shows spherical aberration, astigmatism, and distortion at a telephoto end.

FIGS. 2 to 4 show various aberrations in an in-focus state at infinity in the first numerical example. FIG. 2 shows the various aberrations in the wide-angle end state (focal length f=18.5), FIG. 3 shows the various aberrations in the intermediate focal-length state (focal length f=31.52), and FIG. 4 shows the various aberrations in the telephoto-end state (focal length f=53.5).

For the spherical aberration graph shown in each of FIGS. 2 to 4, a solid line represents values for the d-line (having a wavelength of 587.6 nm), a dotted line represents values for the c-line (having a wavelength of 656.3 nm), and an alternate long and short dash line represents values for the g-line (having a wavelength of 435.8 nm). For the astigmatism graph shown in each of FIGS. 2 to 4, a solid line represents values in a sagittal image plane and a broken line represents values in a meridional image plane.

From the diagrams showing the various aberrations, it is obvious that, in the first numerical example, the zoom lens 1 properly corrects the various aberrations and has excellent imaging performance.

Figure 5:
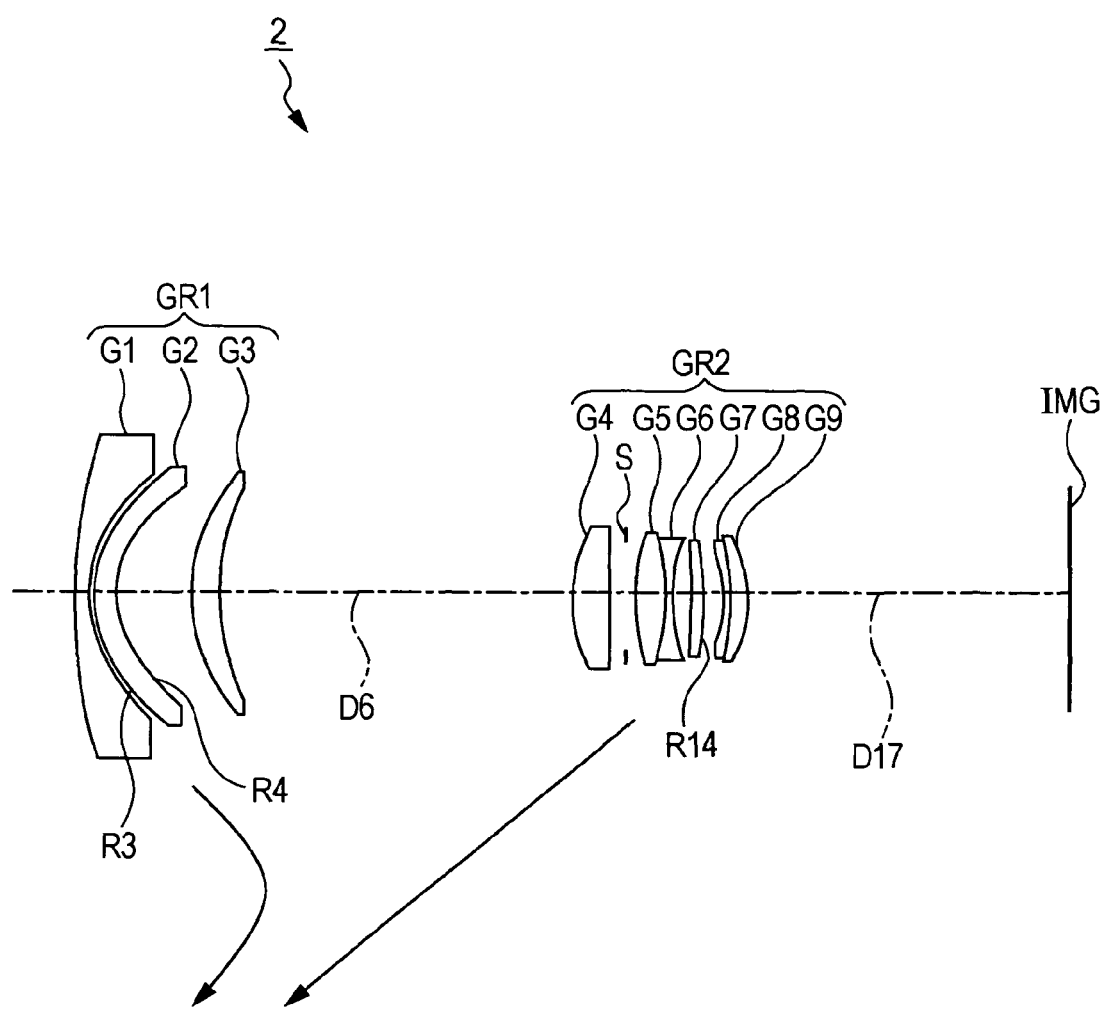
FIG. 5 shows a lens structure of a zoom lens according to a second embodiment of the present invention.

FIG. 5 shows a lens structure (in a wide-angle end state) of a zoom lens 2 according to a second embodiment of the present invention. Each arrow indicates a path of movement of each lens group along the optical axis towards a telephoto end.

As shown in FIG. 5, the zoom lens 2 according to the second embodiment includes nine lenses.

In the zoom lens 2, when magnification is changed between the wide-angle end and the telephoto end, a first lens group GR1 and a second lens group GR2 are moved in an optical axis direction, and, when focusing is performed, the first lens group GR1 is moved in the optical axis direction.

In the zoom lens 2, the first lens group GR1 having a negative refractive power and the second lens group GR2 having a positive refractive power are disposed in that order from the object side to the image side. The first lens group GR1 and the second lens group GR2 each have at least one plastic aspherical lens.

In the first lens group GR1, a first lens G1 having a negative refractive power, a second lens G2 formed of plastic and having a meniscus shape and a negative refractive power, and a third lens G3 having a meniscus shape and a positive refractive power are disposed in that order from the object side to the image side. A concave surface of the first lens G1 faces the image side and has a high curvature. Both surfaces of the second lens G2 are aspherical surfaces.

In the second lens group GR2, a fourth lens G4 having a positive refractive power, a biconvex fifth lens G5, a biconcave sixth lens G6, a seventh lens G7 formed of plastic and having a positive refractive power, an eighth lens G8 having a meniscus shape, and a ninth lens G9 having a meniscus shape are disposed in that order from the object side to the image side. An image-side surface of the seventh lens G7 is an aspherical surface. A concave surface of the eighth lens G8 faces the object side. A convex surface of the ninth lens G9 faces the image side.

The fifth lens G5 and the sixth lens G6 are joined to each other by joining the convex surface of the fifth lens G5 facing the image side and the concave surface of the sixth lens G6 facing the object side, so that a cemented lens having a cemented surface R11 is formed. These convex and concave surfaces have the same curvature radius. The cemented lens has a positive refractive power.

The eighth lens G8 and the ninth lens G9 are joined to each other by joining the convex surface of the eighth lens G8 facing the image side and the concave surface of the ninth lens G9 facing the object side, so that a cemented lens having a cemented surface R16 is formed. These convex and concave surfaces have the same curvature radius. The cemented lens has a positive refractive power.

An aperture stop S (aperture surface R9) is disposed between the fourth lens G4 and the fifth lens G5 of the second lens group GR2. The aperture stop S moves along with the second lens group GR2 in the optical axis direction.

Table 4 shows lens data of a second numerical example in which specific numerical values are applied to the zoom lens 2 according to the second embodiment.

TABLE 4

| SURFACE NUMBER | CURVATURE RADIUS Ri | SURFACE INTERVAL Di | REFRACTIVE INDEX Ni | ABBE NUMBER vi |
|---|---|---|---|---|
| 1 | 72.9357 | 1.7000 | 1.7725 | 49.6 |
| 2 | 18.0216 | 0.7235 | | |
| 3 (ASP) | 17.7152 | 2.2000 | 1.529962 | 55.8 |
| 4 (ASP) | 11.9093 | 9.9873 | | |
| 5 | 23.4743 | 3.3666 | 1.846663 | 23.7 |
| 6 | 32.5433 | D6 | | |
| 7 | 18.1222 | 4.5367 | 1.51742 | 52.1 |
| 8 | −367.1211 | 2.0000 | | |
| 9 | ∞ | 1.0000 | | |
| 10 | 21.6120 | 3.7954 | 1.496997 | 81.6 |
| 11 | −32.4448 | 1.0000 | 1.834001 | 37.3 |
| 12 | 25.9333 | 1.9302 | | |
| 13 | −237.9522 | 1.4617 | 1.529962 | 55.8 |
| 14 (ASP) | −46.2113 | 2.6984 | | |
| 15 | −21.7033 | 1.0000 | 1.806099 | 33.2 |
| 16 | −28.7809 | 2.2292 | 1.487489 | 70.4 |
| 17 | −14.5574 | | | |

In the zoom lens 2, an object-side surface (R3) of the second lens G2 of the first lens group GR1, an image-side surface (R4) of the second lens G2 of the first lens group GR1, and an image-side surface (R14) of the seventh lens G7 of the second lens group GR2 are aspherical surfaces. Table 5 shows conic constants κ, and 4th-order, 6th-order, 8th-order, and 10th-order aspherical coefficients A4, A6, A8, and A10 of the aspherical surfaces in the second numerical example.

TABLE 5

| SURFACE NUMBER | κ | A4 | A6 | A8 | A10 |
|---|---|---|---|---|---|
| 3 | 0.0000 | $0.27778 \times 10^{-4}$ | $-0.37902 \times 10^{-6}$ | $0.15664 \times 10^{-8}$ | $-0.27367 \times 10^{-11}$ |
| 4 | -0.6179 | $0.33097 \times 10^{-4}$ | $-0.57868 \times 10^{-6}$ | $0.25885 \times 10^{-8}$ | $-0.51844 \times 10^{-11}$ |
| 14 | 0.0000 | $0.70259 \times 10^{-4}$ | $0.26014 \times 10^{-6}$ | $-0.18124 \times 10^{-9}$ | $0.14396 \times 10^{-10}$ |

In the zoom lens 2, when magnification is changed from the wide-angle end state to the telephoto end state, a surface interval D6 between the first lens group GR1 and the second lens group GR2 is changed. Table 6 shows F-numbers Fno, and variable intervals at the wide-angle end state (focal length f=18.5), an intermediate focal-length state (focal length f=31.52), and the telephoto-end state (focal length f=53.5) for surface intervals in the second numerical example.

TABLE 6

| | f | | |
|---|---|---|---|
| | 18.5 | 31.52 | 53.5 |
| Fno | 3.59 | 4.56 | 5.77 |
| D6 | 43.1912 | 18.6359 | 4.2964 |

Figure 6:
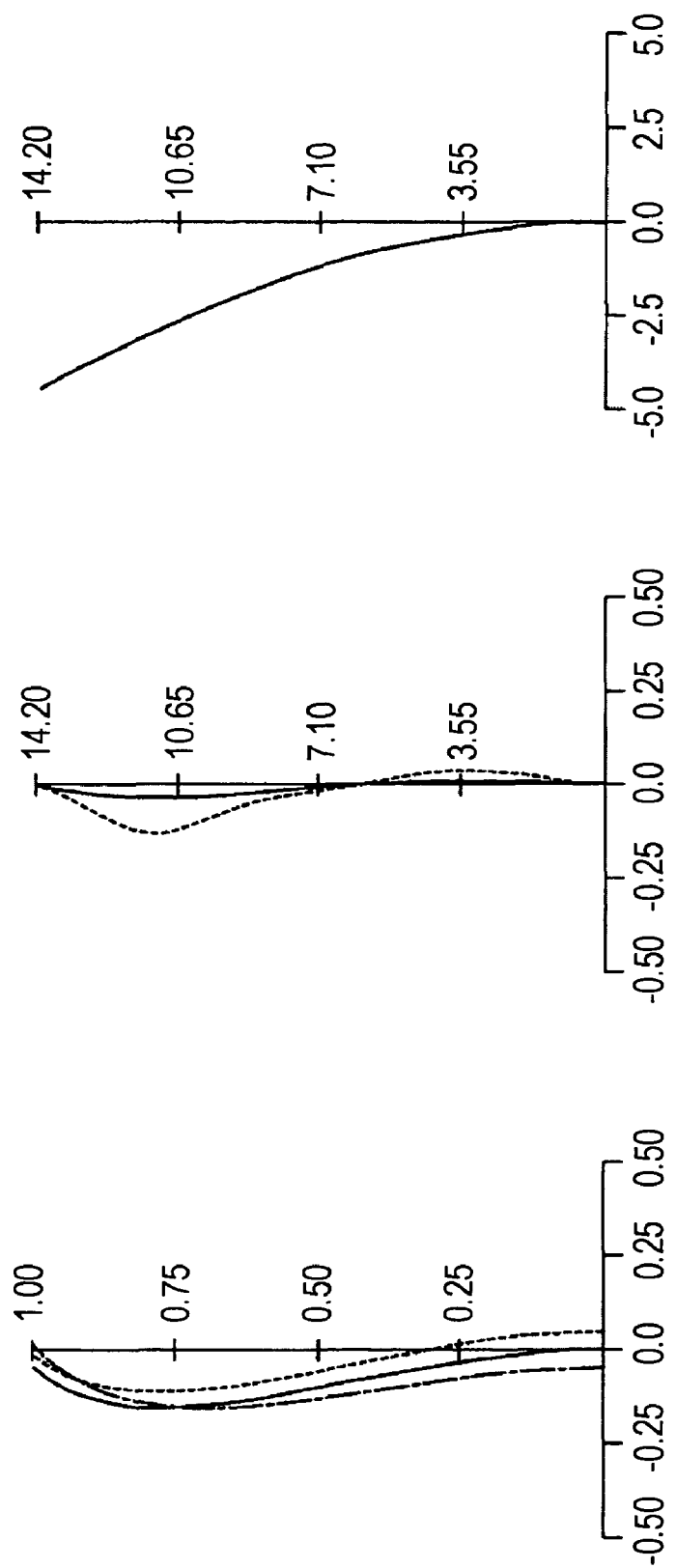
FIG. 6 shows, along with FIGS. 7 and 8, aberrations in a second numerical example in which specific numerical values are applied to the second embodiment.
Figure 7:
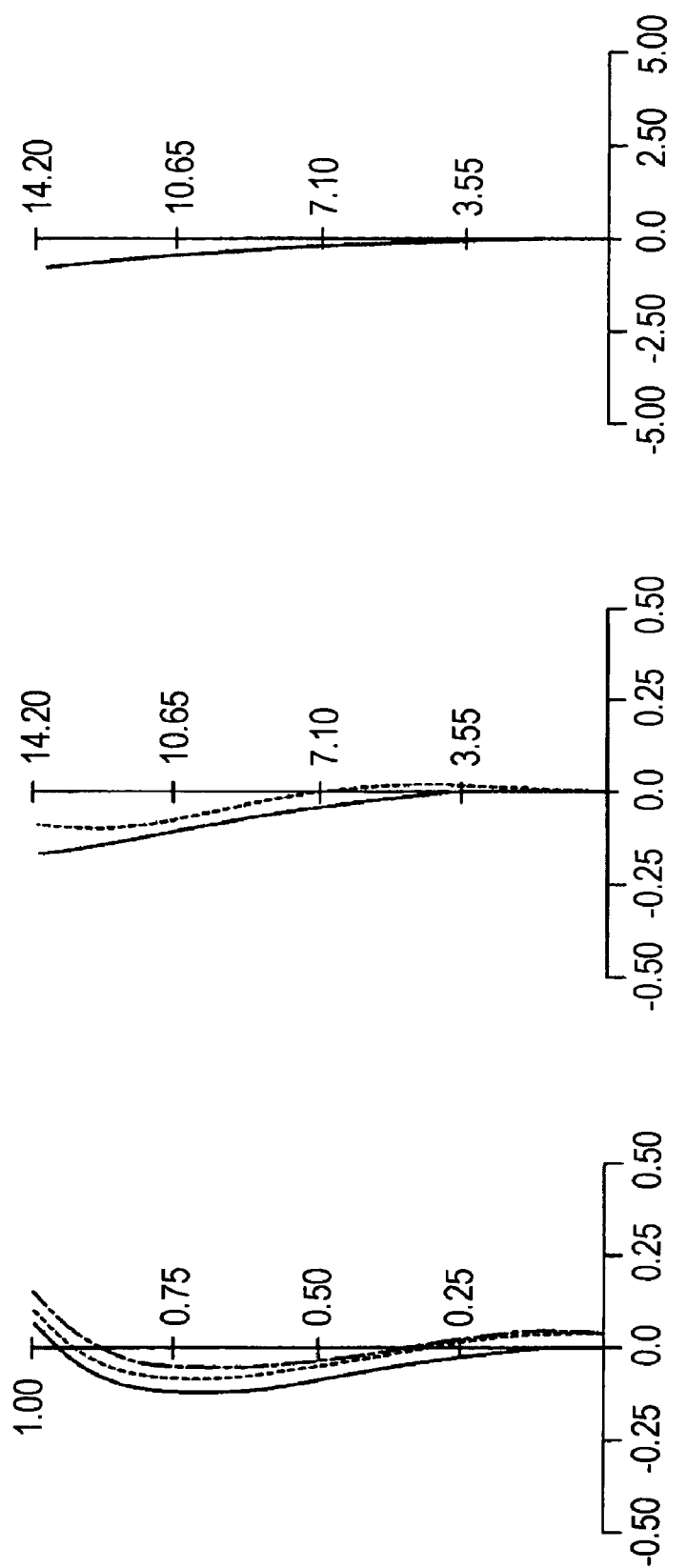
FIG. 7 shows spherical aberration, astigmatism, and distortion at an intermediate focal length.
Figure 8:
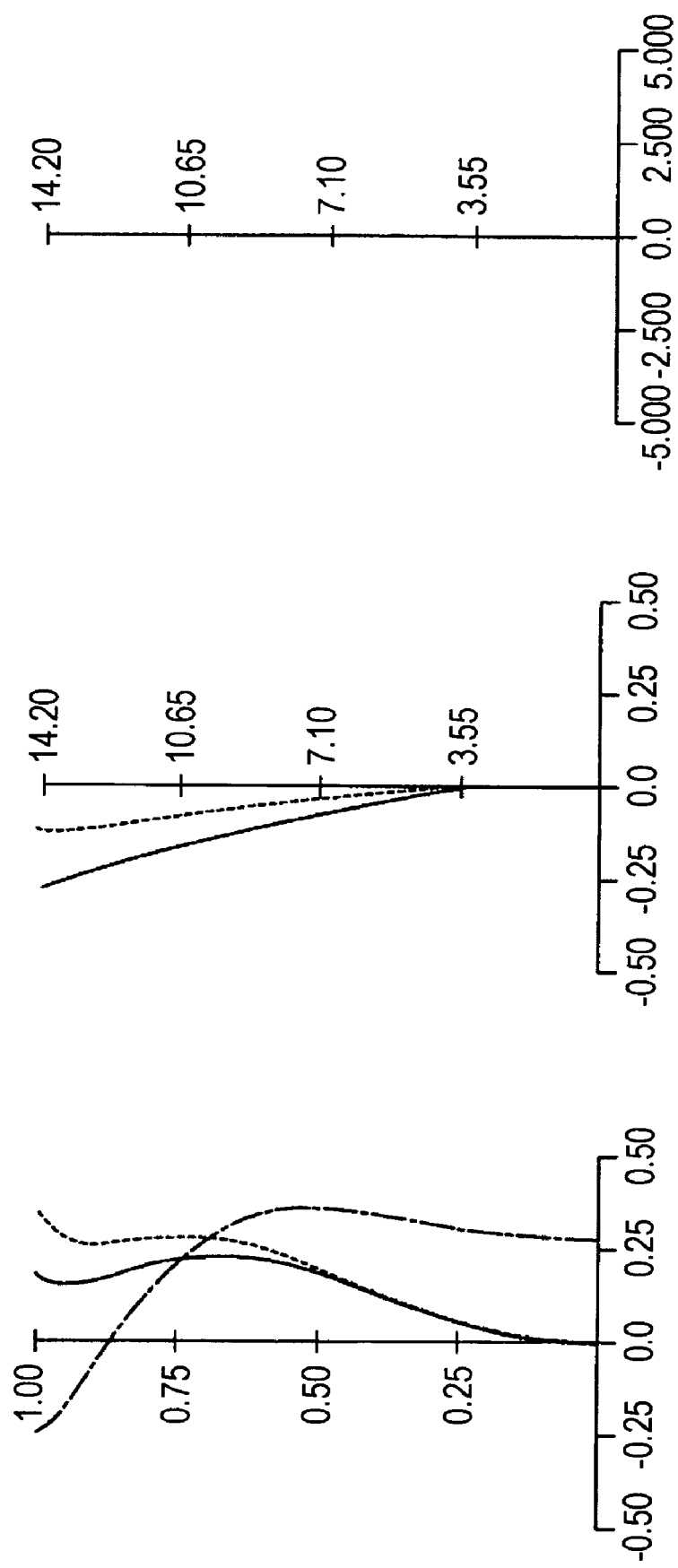
FIG. 8 shows spherical aberration, astigmatism, and distortion at a telephoto end.

FIGS. 6 to 8 show various aberrations in an in-focus state at infinity in the second numerical example. FIG. 6 shows the various aberrations in the wide-angle end state (focal length f=18.5), FIG. 7 shows the various aberrations in the intermediate focal-length state (focal length f=31.52), and FIG. 8 shows the various aberrations in the telephoto-end state (focal length f=53.5).

For the spherical aberration graph shown in each of FIGS. 6 to 8, a solid line represents values for the d-line (having a wavelength of 587.6 nm), a dotted line represents values for the c-line (having a wavelength of 656.3 nm), and an alternate long and short dash line represents values for the g-line (having a wavelength of 435.8 nm). For the astigmatism graph shown in each of FIGS. 6 to 8, a solid line represents values in a sagittal image plane and a broken line represents values in a meridional image plane.

From the diagrams showing the various aberrations, it is obvious that, in the second numerical example, the zoom lens 2 properly corrects the various aberrations and has excellent imaging performance.

Figure 9:
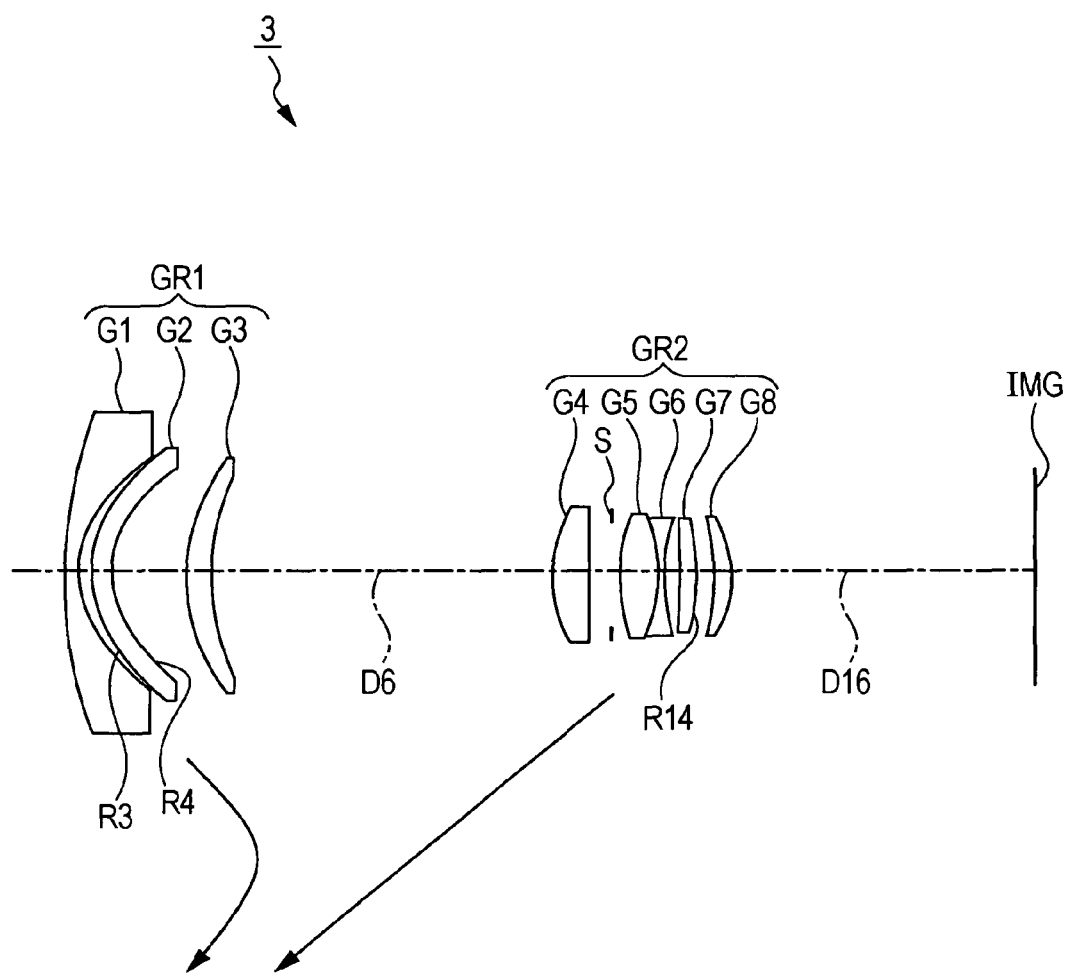
FIG. 9 shows a lens structure of a zoom lens according to a third embodiment of the present invention.

FIG. 9 shows a lens structure (in a wide-angle end state) of a zoom lens 3 according to a third embodiment of the present invention. Each arrow indicates a path of movement of each lens group along the optical axis towards a telephoto end.

As shown in FIG. 9, the zoom lens 3 according to the third embodiment includes eight lenses.

In the zoom lens 3, when magnification is changed between the wide-angle end and the telephoto end, a first lens group GR1 and a second lens group GR2 are moved in an optical axis direction, and, when focusing is performed, the first lens group GR1 is moved in the optical axis direction.

In the zoom lens 3, the first lens group GR1 having a negative refractive power and the second lens group GR2 having a positive refractive power are disposed in that order from the object side to the image side. The first lens group GR1 and the second lens group GR2 each have at least one plastic aspherical lens.

In the first lens group GR1, a first lens G1 having a negative refractive power, a second lens G2 formed of plastic and having a meniscus shape and a negative refractive power, and a third lens G3 having a meniscus shape and a positive refractive power are disposed in that order from the object side to the image side. A concave surface of the first lens G1 faces the image side and has a high curvature. Both surfaces of the second lens G2 are aspherical surfaces.

In the second lens group GR2, a fourth lens G4 having a positive refractive power, a biconvex fifth lens G5, a biconcave sixth lens G6, a seventh lens G7 formed of plastic and having a positive refractive power, and an eighth lens G8 having a meniscus shape and a positive refractive power are disposed in that order from the object side to the image side. An image-side surface of the seventh lens G7 is an aspherical surface.

The fifth lens G5 and the sixth lens G6 are joined to each other by joining the convex surface of the fifth lens G5 facing the image side and the concave surface of the sixth lens G6 facing the object side, so that a cemented lens having a cemented surface R11 is formed. These convex and concave surfaces have the same curvature radius. The cemented lens has a positive refractive power.

An aperture stop S (aperture surface R9) is disposed between the fourth lens G4 and the fifth lens G5 of the second lens group GR2. The aperture stop S moves along with the second lens group GR2 in the optical axis direction.

Table 7 shows lens data of a third numerical example in which specific numerical values are applied to the zoom lens 3 according to the third embodiment.

TABLE 7

| SURFACE NUMBER | CURVATURE RADIUS Ri | SURFACE INTERVAL Di | REFRACTIVE INDEX Ni | ABBE NUMBER vi |
|---|---|---|---|---|
| 1 | 71.1997 | 1.7000 | 1.7725 | 49.6 |
| 2 | 17.1887 | 1.5361 | | |
| 3 (ASP) | 17.4395 | 2.0000 | 1.529962 | 55.8 |
| 4 (ASP) | 11.9998 | 9.7484 | | |
| 5 | 25.4335 | 3.4990 | 1.805181 | 25.4 |
| 6 | 39.4531 | D6 | | |
| 7 | 20.4164 | 4.2742 | 1.540731 | 49.1 |
| 8 | -164.2246 | 3.0000 | | |
| 9 | ∞ | 1.0000 | | |
| 10 | 21.0367 | 4.3867 | 1.496997 | 81.6 |
| 11 | -21.9029 | 1.0000 | 1.834001 | 37.3 |
| 12 | 24.5166 | 1.8811 | | |
| 13 | -2193.0701 | 2.0000 | 1.529962 | 55.8 |
| 14 (ASP) | -52.0068 | 2.6318 | | |
| 15 | -23.8362 | 2.0000 | 1.509937 | 68.0 |
| 16 | -14.9787 | | | |

In the zoom lens 3, an object-side surface (R3) of the second lens G2 of the first lens group GR1, an image-side surface (R4) of the second lens G2 of the first lens group GR1, and an image-side surface (R14) of the seventh lens G7 of the second lens group GR2 are aspherical surfaces. Table 8 shows conic constants κ, and 4th-order, 6th-order, 8th-order, and 10th-order aspherical coefficients A4, A6, A8, and A10 of the aspherical surfaces in the third numerical example.

TABLE 8

| SURFACE NUMBER | κ | A4 | A6 | A8 | A10 |
|---|---|---|---|---|---|
| 3 | 0.0000 | $-0.14734 \times 10^{-4}$ | $0.15644 \times 10^{-7}$ | $-0.13387 \times 10^{-9}$ | $0.68891 \times 10^{-13}$ |
| 4 | −0.9064 | $-0.12669 \times 10^{-5}$ | $-0.10602 \times 10^{-7}$ | $-0.24086 \times 10^{-10}$ | $-1.5732 \times 10^{-12}$ |
| 14 | 0.0000 | $0.46386 \times 10^{-4}$ | $6.6941 \times 10^{-7}$ | $0.47312 \times 10^{-9}$ | $-0.17261 \times 10^{-12}$ |

In the zoom lens 3, when magnification is changed from the wide-angle end state to the telephoto end state, a surface interval D6 between the first lens group GR1 and the second lens group GR2 is changed. Table 9 shows F-numbers Fno, and variable intervals at the wide-angle end state (focal length f=18.5), an intermediate focal-length state (focal length f=31.52), and the telephoto-end state (focal length f=53.5) for surface intervals in the third numerical example.

TABLE 9

| | f | | |
|---|---|---|---|
| | 18.5 | 31.52 | 53.5 |
| Fno | 3.6 | 4.59 | 5.76 |
| D6 | 42.9527 | 17.8316 | 3.1668 |

Figure 10:
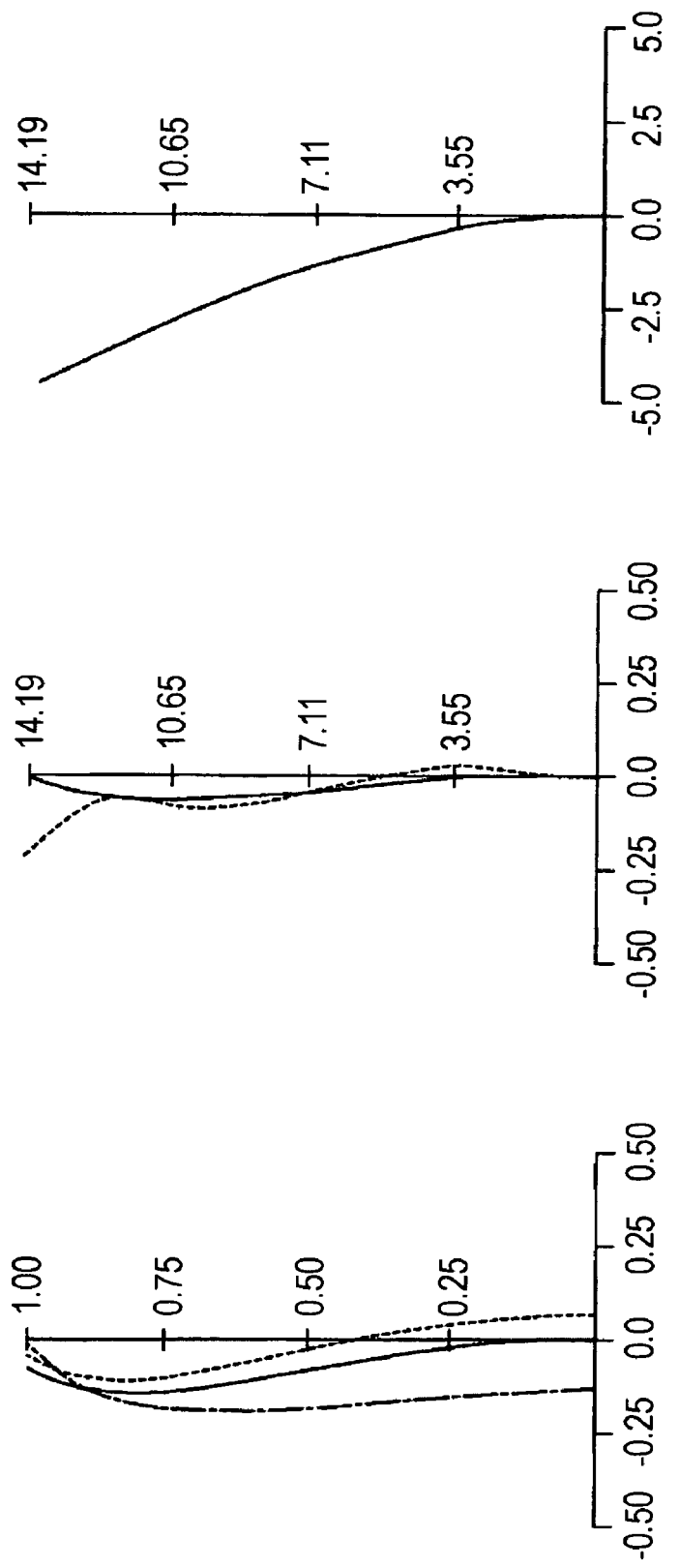
FIG. 10 shows, along with FIGS. 11 and 12, aberrations in a third numerical example in which specific numerical values are applied to the third embodiment.
Figure 11:
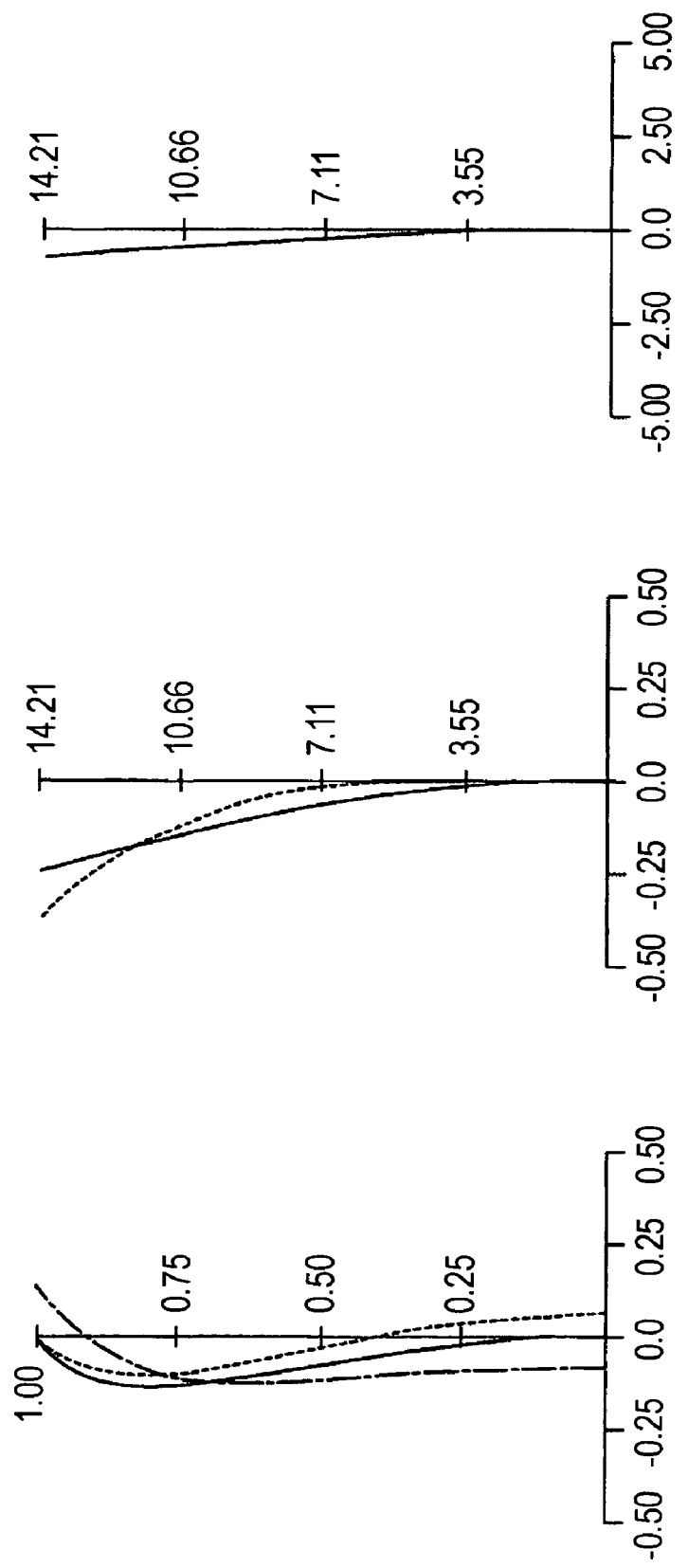
FIG. 11 shows spherical aberration, astigmatism, and distortion at an intermediate focal length.
Figure 12:
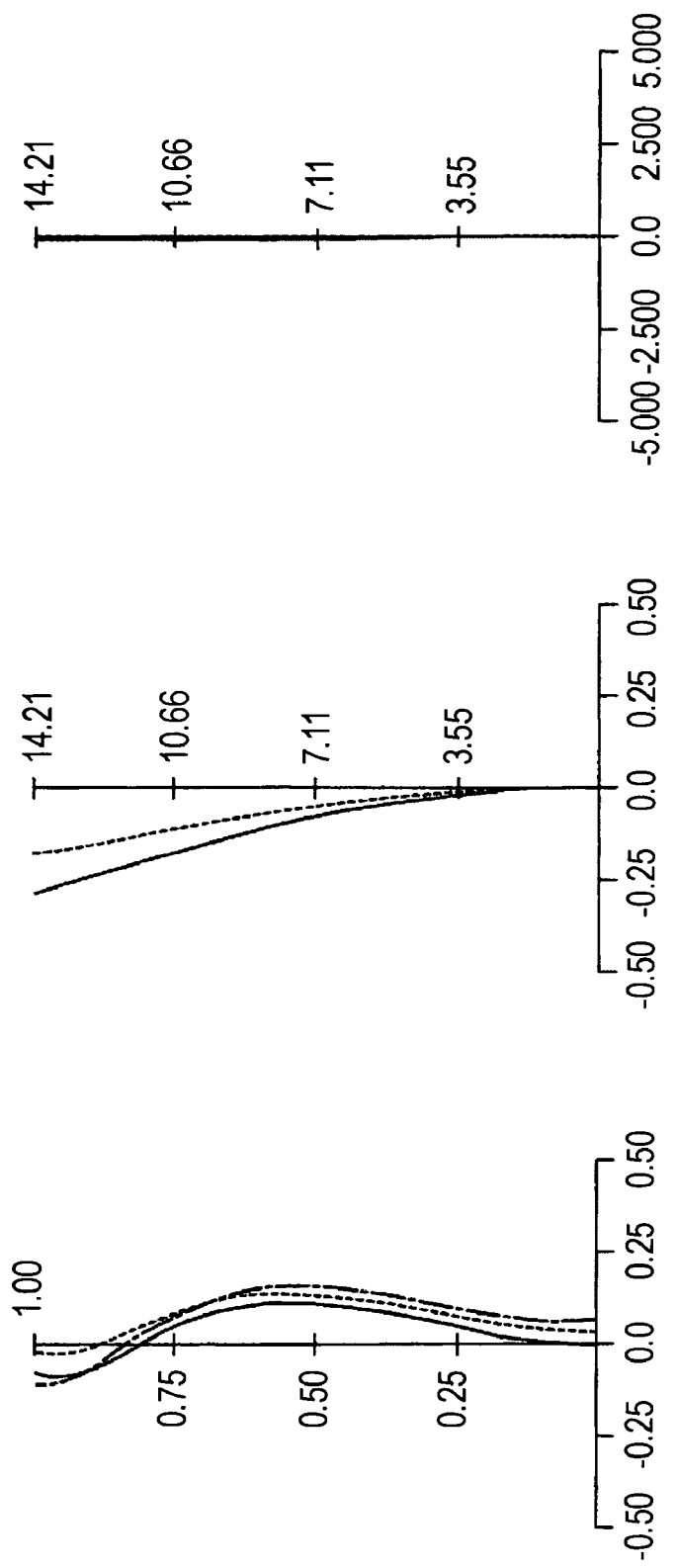
FIG. 12 shows spherical aberration, astigmatism, and distortion at a telephoto end.

FIGS. 10 to 12 show various aberrations in an in-focus state at infinity in the third numerical example. FIG. 10 shows the various aberrations in the wide-angle end state (focal length f=18.5), FIG. 11 shows the various aberrations in the intermediate focal-length state (focal length f=31.52), and FIG. 12 shows the various aberrations in the telephoto-end state (focal length f=53.5).

For the spherical aberration graph shown in each of FIGS. 10 to 12, a solid line represents values for the d-line (having a wavelength of 587.6 nm), a dotted line represents values for the c-line (having a wavelength of 656.3 nm), and an alternate long and short dash line represents values for the g-line (having a wavelength of 435.8 nm). For the astigmatism graph shown in each of FIGS. 10 to 12, a solid line represents values in a sagittal image plane and a broken line represents values in a meridional image plane.

From the diagrams showing the various aberrations, it is obvious that, in the third numerical example, the zoom lens 3 properly corrects the various aberrations and has excellent imaging performance.

Figure 13:
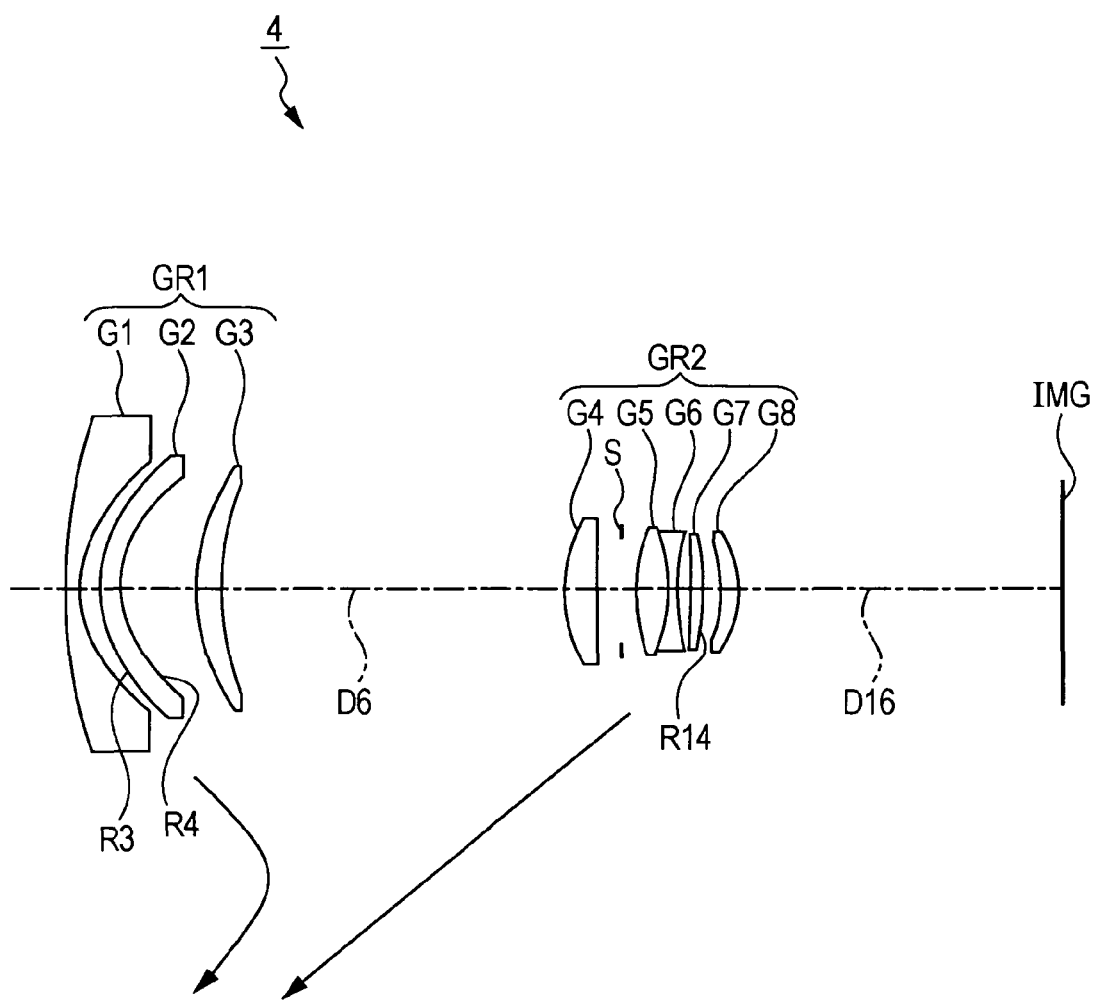
FIG. 13 shows a lens structure of a zoom lens according to a fourth embodiment of the present invention.

FIG. 13 shows a lens structure (in a wide-angle end state) of a zoom lens 4 according to a fourth embodiment of the present invention. Each arrow indicates a path of movement of each lens group along the optical axis towards a telephoto end.

As shown in FIG. 13, the zoom lens 4 according to the fourth embodiment includes eight lenses.

In the zoom lens 4, when magnification is changed between the wide-angle end and the telephoto end, a first lens group GR1 and a second lens group GR2 are moved in an optical axis direction, and, when focusing is performed, the first lens group GR1 is moved in the optical axis direction.

In the zoom lens 4, the first lens group GR1 having a negative refractive power and the second lens group GR2 having a positive refractive power are disposed in that order from the object side to the image side. The first lens group GR1 and the second lens group GR2 each have at least one plastic aspherical lens.

In the first lens group GR1, a first lens G1 having a negative refractive power, a second lens G2 formed of plastic and having a meniscus shape and a negative refractive power, and a third lens G3 having a meniscus shape and a positive refractive power are disposed in that order from the object side to the image side. A concave surface of the first lens G1 faces the image side and has a high curvature. Both surfaces of the second lens G2 are aspherical surfaces.

In the second lens group GR2, a fourth lens G4 having a positive refractive power, a biconvex fifth lens G5, a biconcave sixth lens G6, a seventh lens G7 formed of plastic and having a positive refractive power, and an eighth lens G8 having a meniscus shape and a positive refractive power are disposed in that order from the object side to the image side. An image-side surface of the seventh lens G7 is an aspherical surface.

The fifth lens G5 and the sixth lens G6 are joined to each other by joining the convex surface of the fifth lens G5 facing the image side and the concave surface of the sixth lens G6 facing the object side, so that a cemented lens having a cemented surface R11 is formed. These convex and concave surfaces have the same curvature radius. The cemented lens has a positive refractive power.

An aperture stop S (aperture surface R9) is disposed between the fourth lens G4 and the fifth lens G5 of the second lens group GR2. The aperture stop S moves along with the second lens group GR2 in the optical axis direction.

Table 10 shows lens data of a fourth numerical example in which specific numerical values are applied to the zoom lens 4 according to the fourth embodiment.

TABLE 10

| SURFACE NUMBER | CURVATURE RADIUS Ri | SURFACE INTERVAL Di | REFRACTIVE INDEX Ni | ABBE NUMBER vi |
|---|---|---|---|---|
| 1 | 69.9988 | 1.7000 | 1.7725 | 49.6 |
| 2 | 17.9114 | 2.7388 | | |
| 3 (ASP) | 18.4919 | 2.0000 | 1.529962 | 55.8 |
| 4 (ASP) | 12.2427 | 9.5136 | | |
| 5 | 25.7850 | 3.1109 | 1.846663 | 23.7 |
| 6 | 38.3592 | D6 | | |
| 7 | 19.6539 | 3.7853 | 1.603111 | 60.6 |
| 8 | −508.0815 | 3.0222 | | |
| 9 | ∞ | 2.0000 | | |
| 10 | 22.2449 | 3.6070 | 1.487489 | 70.4 |
| 11 | −21.6354 | 1.0000 | 1.834001 | 37.3 |
| 12 | 25.9142 | 1.7543 | | |
| 13 | 733.9116 | 1.0000 | 1.529962 | 55.8 |
| 14 (ASP) | −81.3911 | 2.6716 | | |
| 15 | −25.7270 | 2.0000 | 1.516798 | 64.1 |
| 16 | −15.0183 | | | |

In the zoom lens 4, an object-side surface (R3) of the second lens G2 of the first lens group GR1, an image-side surface (R4) of the second lens G2 of the first lens group GR1, and an image-side surface (R14) of the seventh lens G7 of the second lens group GR2 are aspherical surfaces. Table 11 shows conic constants κ, and 4th-order, 6th-order, 8th-order, and 10th-order aspherical coefficients A4, A6, A8, and A10 of the aspherical surfaces in the fourth numerical example.

TABLE 11

| SURFACE NUMBER | κ | A4 | A6 | A8 | A10 |
|---|---|---|---|---|---|
| 3 | 0.0000 | $-0.18900 \times 10^{-4}$ | $0.17906 \times 10^{-7}$ | $-0.98843 \times 10^{-10}$ | $0.15008 \times 10^{-12}$ |
| 4 | −1.0139 | 0.0000 | 0.0000 | 0.0000 | 0.0000 |
| 14 | 0.0000 | $0.58947 \times 10^{-4}$ | $-0.47675 \times 10^{-8}$ | $0.23015 \times 10^{-8}$ | $-0.12841 \times 10^{-10}$ |

In the zoom lens 4, when magnification is changed from the wide-angle end state to the telephoto end state, a surface interval D6 between the first lens group GR1 and the second lens group GR2 is changed. Table 12 shows F-numbers Fno, and variable intervals at the wide-angle end state (focal length f=18.5), an intermediate focal-length state (focal length f=31.52), and the telephoto-end state (focal length f=53.5) for surface intervals in the fourth numerical example.

TABLE 12

| | f | | |
|---|---|---|---|
| | 18.5 | 31.52 | 53.5 |
| Fno | 3.6 | 4.60 | 5.76 |
| D6 | 41.6817 | 16.9231 | 2.4700 |

Figure 14:
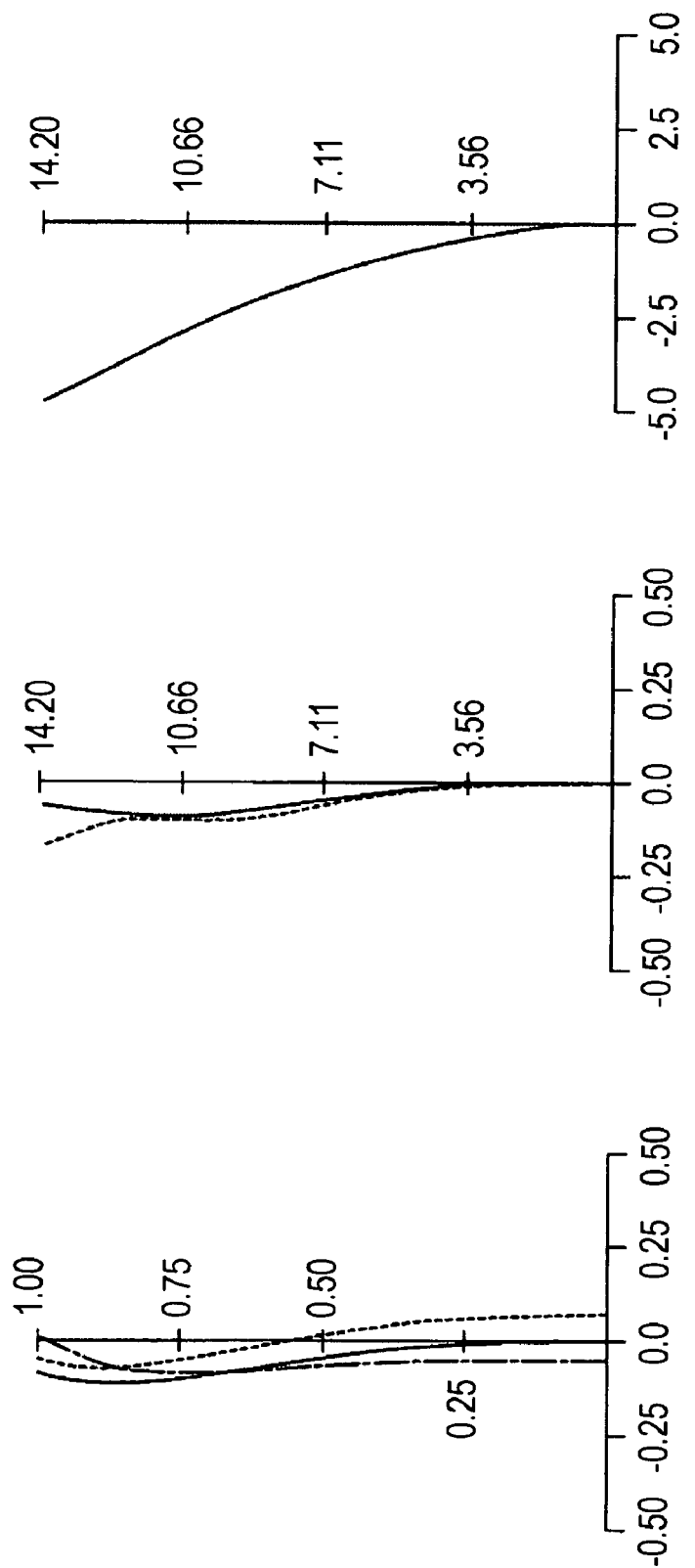
FIG. 14 shows, along with FIGS. 15 and 16, aberrations in a fourth numerical example in which specific numerical values are applied to the fourth embodiment.
Figure 15:
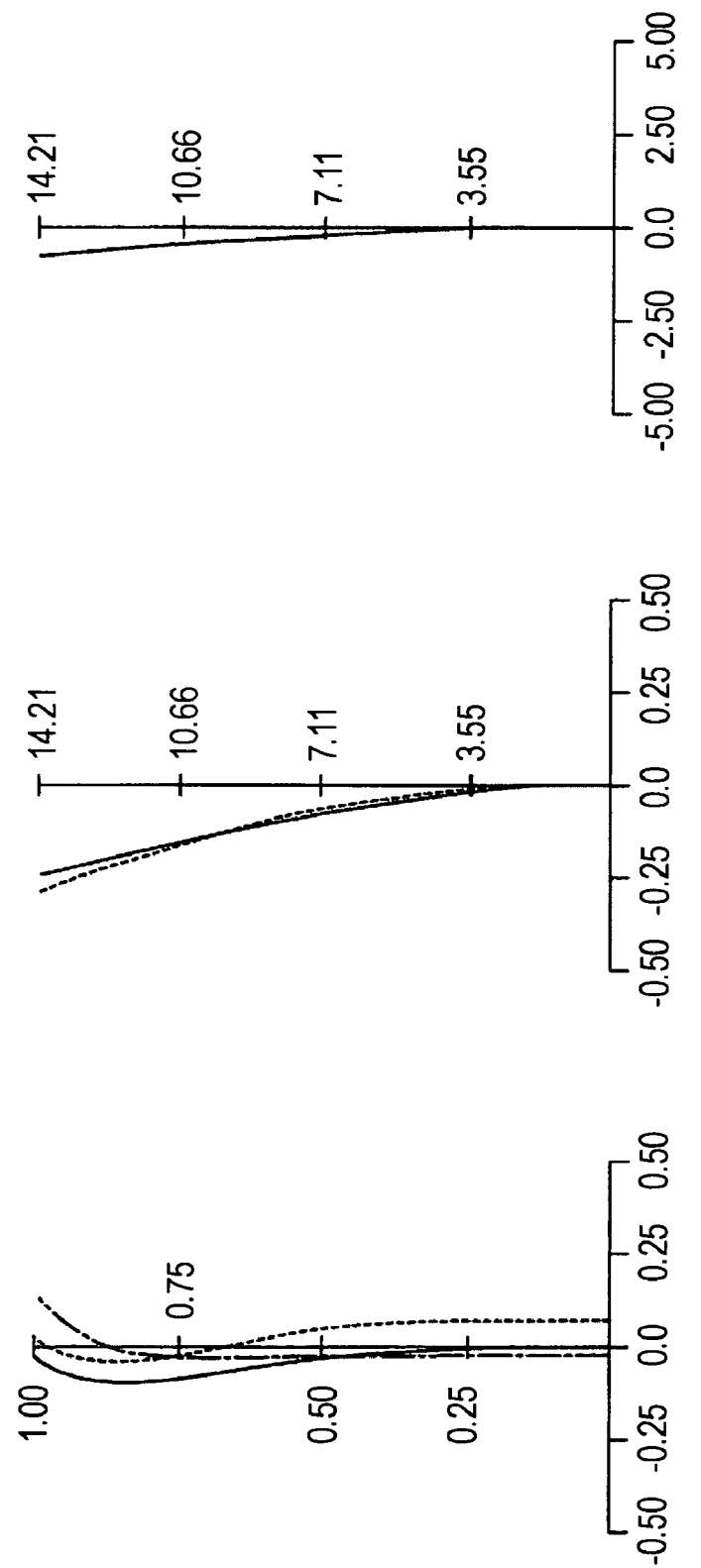
FIG. 15 shows spherical aberration, astigmatism, and distortion at an intermediate focal length.
Figure 16:
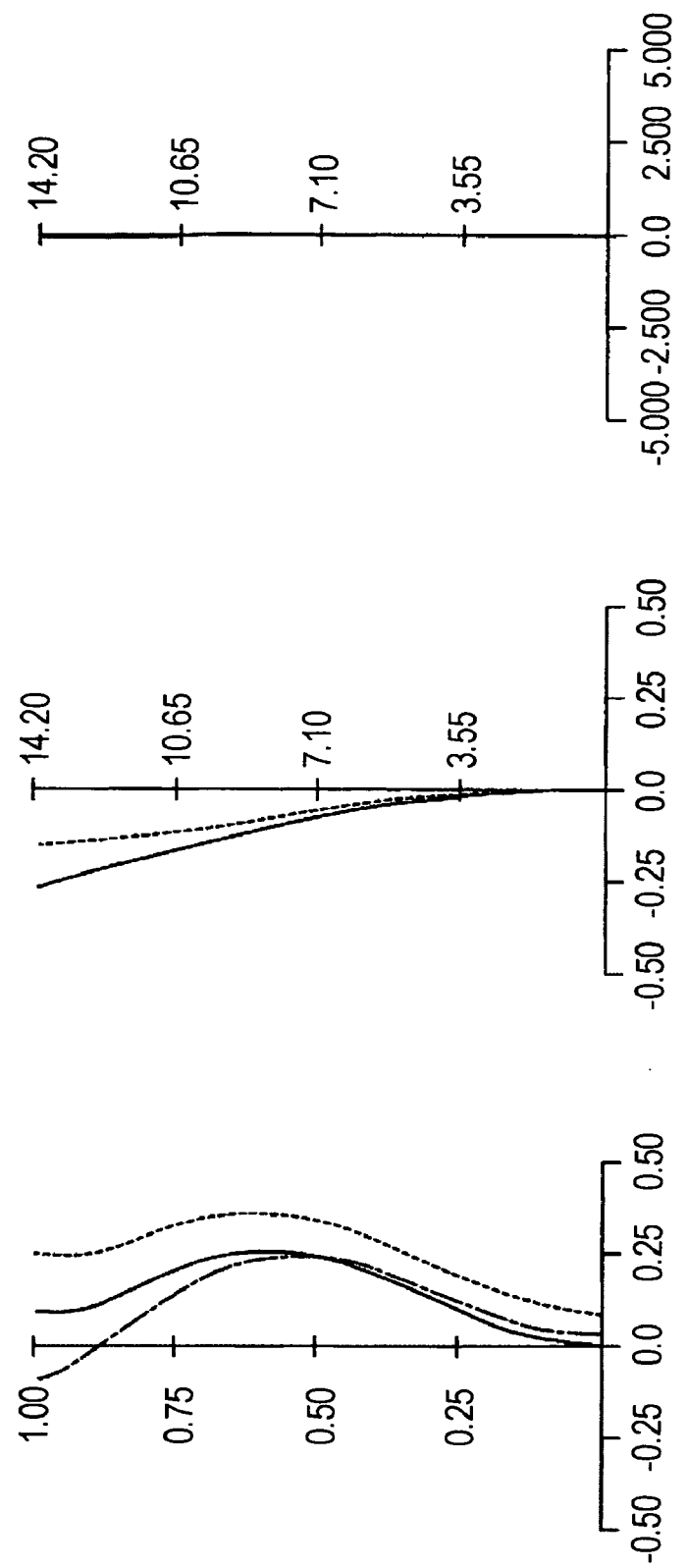
FIG. 16 shows spherical aberration, astigmatism, and distortion at a telephoto end.

FIGS. 14 to 16 show various aberrations in an in-focus state at infinity in the fourth numerical example. FIG. 14 shows the various aberrations in the wide-angle end state (focal length f=18.5), FIG. 15 shows the various aberrations in the intermediate focal-length state (focal length f=31.52), and FIG. 16 shows the various aberrations in the telephoto-end state (focal length f=53.5).

For the spherical aberration graph shown in each of FIGS. 14 to 16, a solid line represents values for the d-line (having a wavelength of 587.6 nm), a dotted line represents values for the c-line (having a wavelength of 656.3 nm), and an alternate long and short dash line represents values for the g-line (having a wavelength of 435.8 nm). For the astigmatism graph shown in each of FIGS. 14 to 16, a solid line represents values in a sagittal image plane and a broken line represents values in a meridional image plane.

From the diagrams showing the various aberrations, it is obvious that, in the fourth numerical example, the zoom lens 4 properly corrects the various aberrations and has excellent imaging performance.

Figure 17:
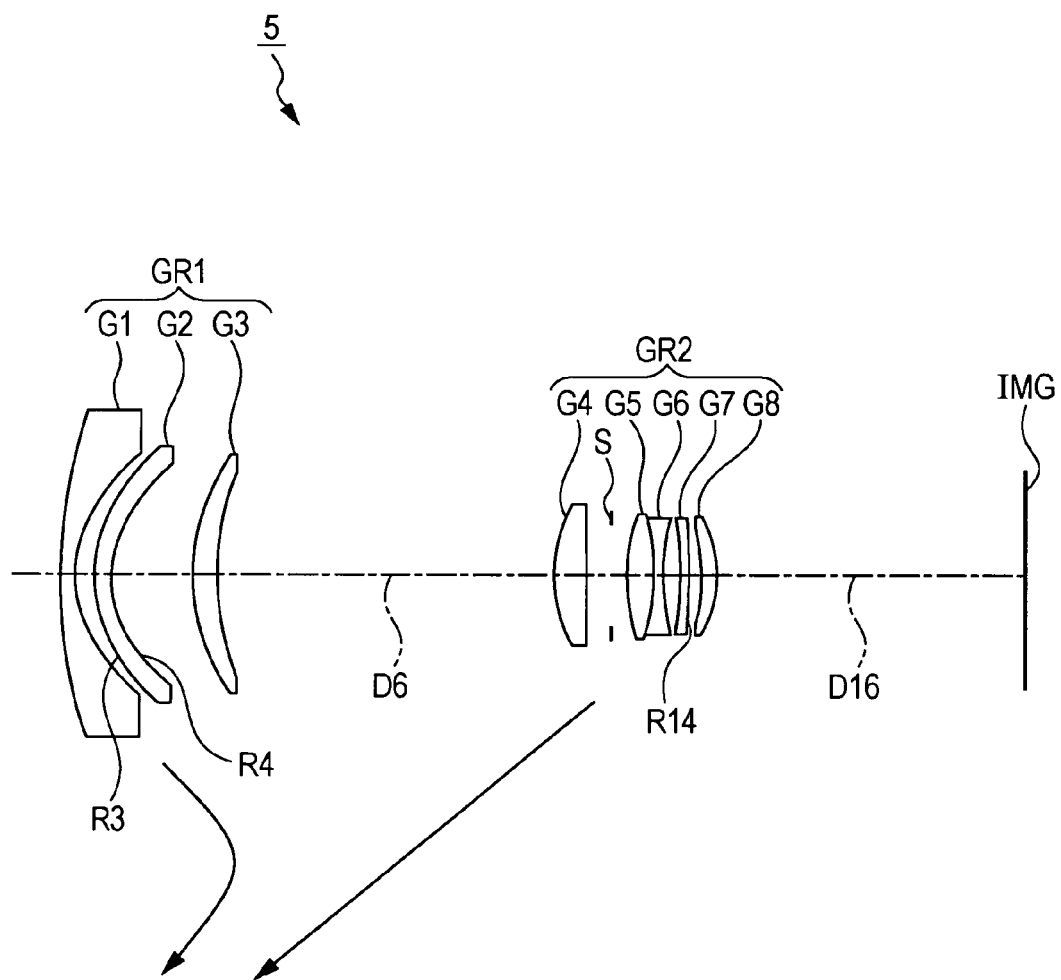
FIG. 17 shows a lens structure of a zoom lens according to a fifth embodiment of the present invention.

FIG. 17 shows a lens structure (in a wide-angle end state) of a zoom lens 5 according to a fifth embodiment of the present invention. Each arrow indicates a path of movement of each lens group along the optical axis towards a telephoto end.

As shown in FIG. 17, the zoom lens 5 according to the fifth embodiment includes eight lenses.

In the zoom lens 5, when magnification is changed between the wide-angle end and the telephoto end, a first lens group GR1 and a second lens group GR2 are moved in an optical axis direction, and, when focusing is performed, the first lens group GR1 is moved in the optical axis direction.

In the zoom lens 5, the first lens group GR1 having a negative refractive power and the second lens group GR2 having a positive refractive power are disposed in that order from the object side to the image side. The first lens group GR1 and the second lens group GR2 each have at least one plastic aspherical lens.

In the first lens group GR1, a first lens G1 having a negative refractive power, a second lens G2 formed of plastic and having a meniscus shape and a negative refractive power, and a third lens G3 having a meniscus shape and a positive refractive power are disposed in that order from the object side to the image side. A concave surface of the first lens G1 faces the image side and has a high curvature. Both surfaces of the second lens G2 are aspherical surfaces.

In the second lens group GR2, a fourth lens G4 having a positive refractive power, a biconvex fifth lens G5, a biconcave sixth lens G6, a seventh lens G7 formed of plastic and having a positive refractive power, and an eighth lens G8 having a meniscus shape and a positive refractive power are disposed in that order from the object side to the image side. An image-side surface of the seventh lens G7 is an aspherical surface.

The fifth lens G5 and the sixth lens G6 are joined to each other by joining the convex surface of the fifth lens G5 facing the image side and the concave surface of the sixth lens G6 facing the object side, so that a cemented lens having a cemented surface R11 is formed. These convex and concave surfaces have the same curvature radius. The cemented lens has a positive refractive power.

An aperture stop S (aperture surface R9) is disposed between the fourth lens G4 and the fifth lens G5 of the second lens group GR2. The aperture stop S moves along with the second lens group GR2 in the optical axis direction.

Table 13 shows lens data of a fifth numerical example in which specific numerical values are applied to the zoom lens 5 according to the fifth embodiment.

TABLE 13

| SURFACE NUMBER | CURVATURE RADIUS Ri | SURFACE INTERVAL Di | REFRACTIVE INDEX Ni | ABBE NUMBER vi |
|---|---|---|---|---|
| 1 | 69.0170 | 1.7000 | 1.7725 | 49.6 |
| 2 | 18.1386 | 2.6067 | | |
| 3 (ASP) | 18.4176 | 1.7000 | 1.529962 | 55.8 |
| 4 (ASP) | 12.5753 | 9.1668 | | |
| 5 | 26.2313 | 3.4483 | 1.846663 | 23.7 |
| 6 | 39.9939 | D6 | | |
| 7 | 18.6185 | 4.2671 | 1.620409 | 60.3 |
| 8 | −171.2021 | 2.0000 | | |
| 9 | ∞ | 1.0000 | | |
| 10 | 29.2650 | 3.6204 | 1.487489 | 70.4 |
| 11 | −19.9776 | 1.0000 | 1.834001 | 37.3 |
| 12 | 29.6489 | 1.8192 | | |
| 13 | −100.0000 | 1.0000 | 1.529962 | 55.8 |
| 14 (ASP) | −86.5877 | 2.6563 | | |
| 15 | −26.5493 | 2.1547 | 1.516798 | 64.1 |
| 16 | −13.8022 | | | |

In the zoom lens 5, an object-side surface (R3) of the second lens G2 of the first lens group GR1, an image-side surface (R4) of the second lens G2 of the first lens group GR1, and an image-side surface (R14) of the seventh lens G7 of the second lens group GR2 are aspherical surfaces. Table 14 shows conic constants κ, and 4th-order, 6th-order, 8th-order, and 10th-order aspherical coefficients A4, A6, A8, and A10 of the aspherical surfaces in the fifth numerical example.

TABLE 14

| SURFACE NUMBER | κ | A4 | A6 | A8 | A10 |
|---|---|---|---|---|---|
| 3 | 0.0000 | $-0.18419 \times 10^{-4}$ | $0.14468 \times 10^{-7}$ | $-0.98143 \times 10^{-10}$ | $0.19744 \times 10^{-12}$ |
| 4 | $-1.0355$ | 0.0000 | 0 | 0 | 0 |
| 14 | 0.0000 | $0.69774 \times 10^{-4}$ | $0.72183 \times 10^{-7}$ | $0.95371 \times 10^{-9}$ | $-0.69408 \times 10^{-11}$ |

In the zoom lens 5, when magnification is changed from the wide-angle end state to the telephoto end state, a surface interval D6 between the first lens group GR1 and the second lens group GR2 is changed. Table 15 shows F-numbers Fno, and variable intervals at the wide-angle end state (focal length f=18.5), an intermediate focal-length state (focal length f=31.52), and the telephoto-end state (focal length f=53.5) for surface intervals in the fifth numerical example.

TABLE 15

|  | f |  |  |
|---|---|---|---|
|  | 18.5 | 31.52 | 53.5 |
| Fno | 3.6 | 4.54 | 5.74 |
| D6 | 41.4252 | 16.8266 | 2.4729 |

Figure 18:
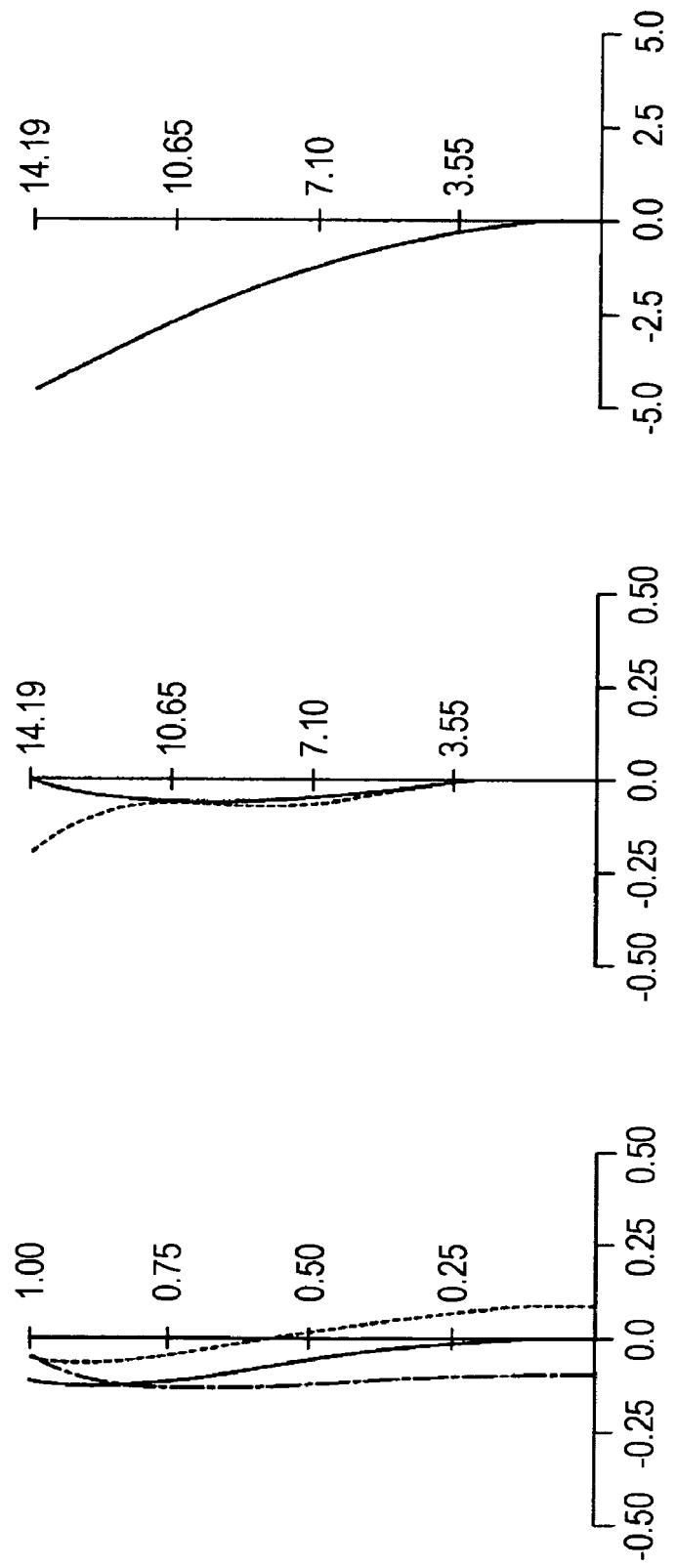
FIG. 18 shows, along with FIGS. 19 and 20, aberrations in a fifth numerical example in which specific numerical values are applied to the fifth embodiment.
Figure 19:
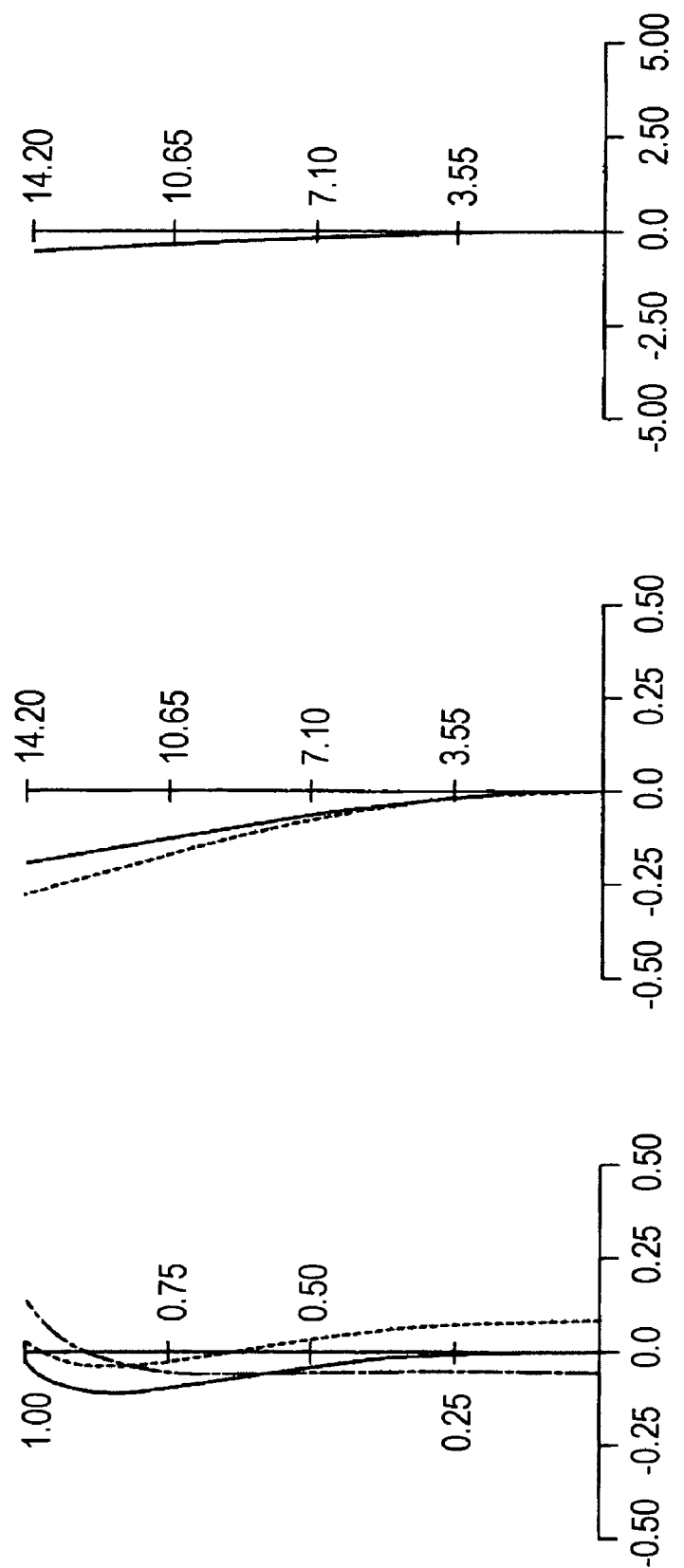
FIG. 19 shows spherical aberration, astigmatism, and distortion at an intermediate focal length.
Figure 20:
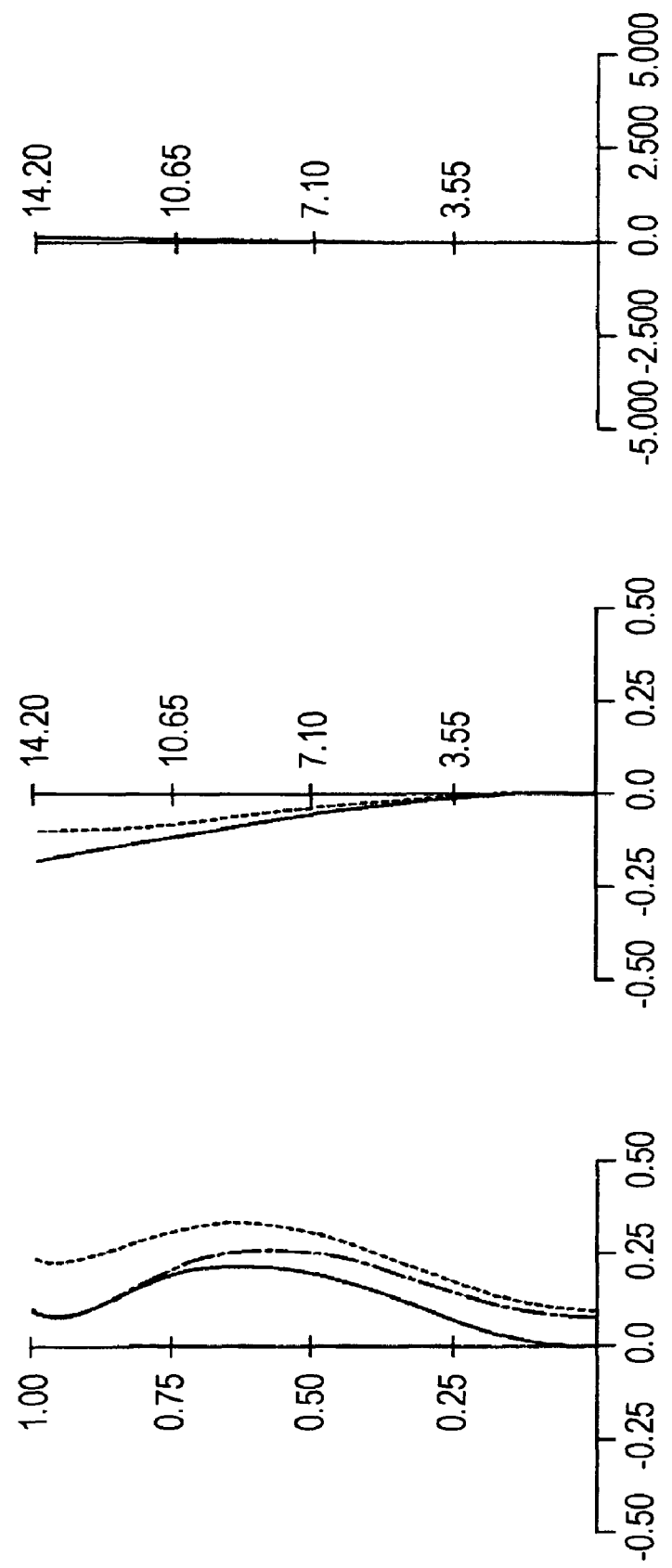
FIG. 20 shows spherical aberration, astigmatism, and distortion at a telephoto end.

FIGS. 18 to 20 show various aberrations in an in-focus state at infinity in the fifth numerical example. FIG. 18 shows the various aberrations in the wide-angle end state (focal length f=18.5), FIG. 19 shows the various aberrations in the intermediate focal-length state (focal length f=31.52), and FIG. 20 shows the various aberrations in the telephoto-end state (focal length f=53.5).

For the spherical aberration graph shown in each of FIGS. 18 to 20, a solid line represents values for the d-line (having a wavelength of 587.6 nm), a dotted line represents values for the c-line (having a wavelength of 656.3 nm), and an alternate long and short dash line represents values for the g-line (having a wavelength of 435.8 nm). For the astigmatism graph shown in each of FIGS. 18 to 20, a solid line represents values in a sagittal image plane and a broken line represents values in a meridional image plane.

From the diagrams showing the various aberrations, it is obvious that, in the fifth numerical example, the zoom lens 5 properly corrects the various aberrations and has excellent imaging performance.

Table 16 shows various values of the aforementioned Conditional Expressions (1) to (9) in the zoom lenses 1, 2, 3, 4, and 5. That is, Table 16 shows fw, bkw, and fw/bkw of the Conditional Expression (1); X1, X0, h0, and |(X1−X0)/h0| of the Conditional Expression (2); X3, X2, h1, and |(X3−X2)/h1| of the Conditional Expression (3); f1 and f1/fw of the Conditional Expression (4); fasp1 and fasp1/f1 of the Conditional Expression (5); κ of the Conditional Expression (6); 66 ν of the Conditional Expression (7); fasp2, f2, and |fasp2/f2| of the Conditional Expression (8); and X5, X4, h2, and |(X5−X4)/h2| of the Conditional Expression (9).

TABLE 16

|  |  | ZOOM LENS 1 | ZOOM LENS 2 | ZOOM LENS 3 | ZOOM LENS 4 | ZOOM LENS 5 |
|---|---|---|---|---|---|---|
|  | fw | 18.5 | 18.4993 | 18.5 | 18.5 | 18.518 |
|  | bkw | 38.5029 | 38.7351 | 38.2592 | 37.043 | 37.0546 |
| CONDITIONAL EXPRESSION (1) | fw/bkw | 0.48048 | 0.47758 | 0.48354 | 0.49942 | 0.49975 |
|  | X1 | 2.499935 | 2.350564 | 1.820831 | 2.257818 | 1.943408 |
|  | X0 | 2.2 | 2.2 | 2 | 2 | 1.7 |
|  | h0 | 14.2595 | 13.7708 | 14.1377 | 14.0363 | 13.9873 |
| CONDITIONAL EXPRESSION (2) | |(X1 − X0)/h0| | 0.02103 | 0.01093 | 0.01267 | 0.01837 | 0.01740 |
|  | X3 | 0.164395 | 0.212658 | 1.158995 | 1.43653 | 1.372789 |
|  | X2 | 0.5748 | 0.7235 | 1.5361 | 2.7388 | 2.522 |
|  | h1 | 15.49 | 14.9748 | 15.0928 | 15.1759 | 14.9539 |
| CONDITIONAL EXPRESSION (3) | |(X3 − X2)/h1| | 0.02649 | 0.03411 | 0.02499 | 0.08581 | 0.07685 |
|  | f1 | −31.7718 | −31.7481 | −32.1803 | −32.3926 | −32.4029 |
|  | fw | 18.5 | 18.4993 | 18.5 | 18.5 | 18.518 |
| CONDITIONAL EXPRESSION (4) | f1/fw | −1.71739 | −1.71618 | −1.73948 | −1.75095 | −1.74981 |
|  | fasp1 | −75 | −78.927 | −83.188 | −76.881 | −83.188 |
|  | f1 | −31.7718 | −31.7481 | −32.1803 | −32.3926 | −32.4029 |
| CONDITIONAL EXPRESSION (5) | fasp1/f1 | 2.36058 | 2.48604 | 2.58506 | 2.37341 | 2.56730 |
| CONDITIONAL EXPRESSION (6) | κ | −0.82044 | −0.61785 | −0.90635 | −1.01392 | −1.0355 |
| CONDITIONAL EXPRESSION (7) | Δν | 44.2633 | 44.2633 | 44.2633 | 33.0961 | 33.0961 |
|  | fasp2 | 252.981 | 107.928 | 100.484 | 138.306 | 317.557 |
|  | f2 | 34.8023 | 34.6393 | 34.9619 | 34.2315 | 34.0705 |
| CONDITIONAL EXPRESSION (8) | |fasp2/f2| | 7.26909 | 3.11577 | 2.87410 | 4.04031 | 9.32059 |
|  | X5 | 0.030767 | 0.224921 | 0.316989 | 0.175923 | 0.002642 |
|  | X4 | 1.46717 | 1.4617 | 2 | 1 | 1 |
|  | h2 | 6.6767 | 6.542 | 6.6257 | 6.379 | 6.3985 |
| CONDITIONAL EXPRESSION (9) | |(X5 − X4)/h2| | 0.21514 | 0.18905 | 0.25401 | 0.12919 | 0.15587 |

As is clear from Table 16, the zoom lenses 1, 2, 3, 4, and 5 satisfy the Conditional Expressions (1) to (9).

Next, an image pickup device according to an embodiment of the present invention will be described.

The image pickup device according to the embodiment of the present invention is one including a zoom lens and an image pickup element that converts an optical image formed by the zoom lens into an electrical signal.

In the zoom lens of the image pickup device, a first lens group having a negative refractive power and a second lens group having a positive refractive power are disposed in that order from an object side to an image side. In addition, during a change in magnification between a wide-angle end and a telephoto end, the first and second lens groups are moved in an optical axis direction. Further, the first lens group and the second lens group each have at least one plastic aspherical lens.

Therefore, in the image pickup device according to the embodiment of the present invention, since the first lens group and the second lens group of the zoom lens each have at least one plastic aspherical lens, the image pickup device can be reduced in weight.

The zoom lens of the image pickup device according to the embodiment of the present invention satisfies the following Conditional Expressions (1) and (2), $$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

The Conditional Expression (1) defines the ratio between the focal length and the back focus at the wide-angle end.

When fw/bkw exceeds the upper limit of the Conditional Expression (1), it is difficult to provide the required back focus. In particular, when the zoom lens is used as an interchangeable lens mountable to a digital single-lens reflex camera, the zoom lens may come into contact with a quick return mirror of a camera body. In addition, when fw/bkw exceeds the upper limit of the Conditional Expression (1), the zoom lens may be influenced by shading because an exit pupil position is too close to an image plane.

In contrast, when fw/bkw falls below the lower limit of Conditional Expression (1), the zoom lens can no longer be reduced in size because the back focus becomes too long.

Therefore, in the image pickup device according to the embodiment of the present invention, when the zoom lens satisfies the Conditional Expression (1), it is possible to provide a required and sufficient back focus and to reduce the influence of shading and the size of the image pickup device. In particular, when the zoom lens is used as an interchangeable lens mountable to a digital single-lens reflex camera, it is possible to prevent the zoom lens and the quick return mirror of the camera body from contacting each other.

The Conditional Expression (2) defines the ratio between the thickness difference and the effective radius. The thickness difference is that between the on-axis thickness of the plastic aspherical lens of the first lens group and the off-axis thickness of the plastic aspherical lens of the first lens group.

When $|(X1-X0)/h0|$ exceeds the upper limit of the Conditional Expression (2), the sensitivity with respect to various aberrations of the plastic aspherical lens becomes too high, and, in particular, it becomes difficult to restriction variations in aberrations based on changes in shape caused by temperature.

In contrast, when $|(X1-X0)/h0|$ falls below the lower limit of the Conditional Expression (2), the refractive power of the plastic aspherical lens becomes too small. Therefore, at the wide-angle side, the effect of correcting distortion and curvature of field is reduced, thereby increasing the diameter of the foremost lens in the first lens group. Therefore, the image pickup device can no longer be reduced in size.

Therefore, when the zoom lens of the image pickup device according to the embodiment of the present invention satisfies the Conditional Expression (2), it is possible to properly correct aberrations and to reduce the size of the image pickup device.

Figure 21:
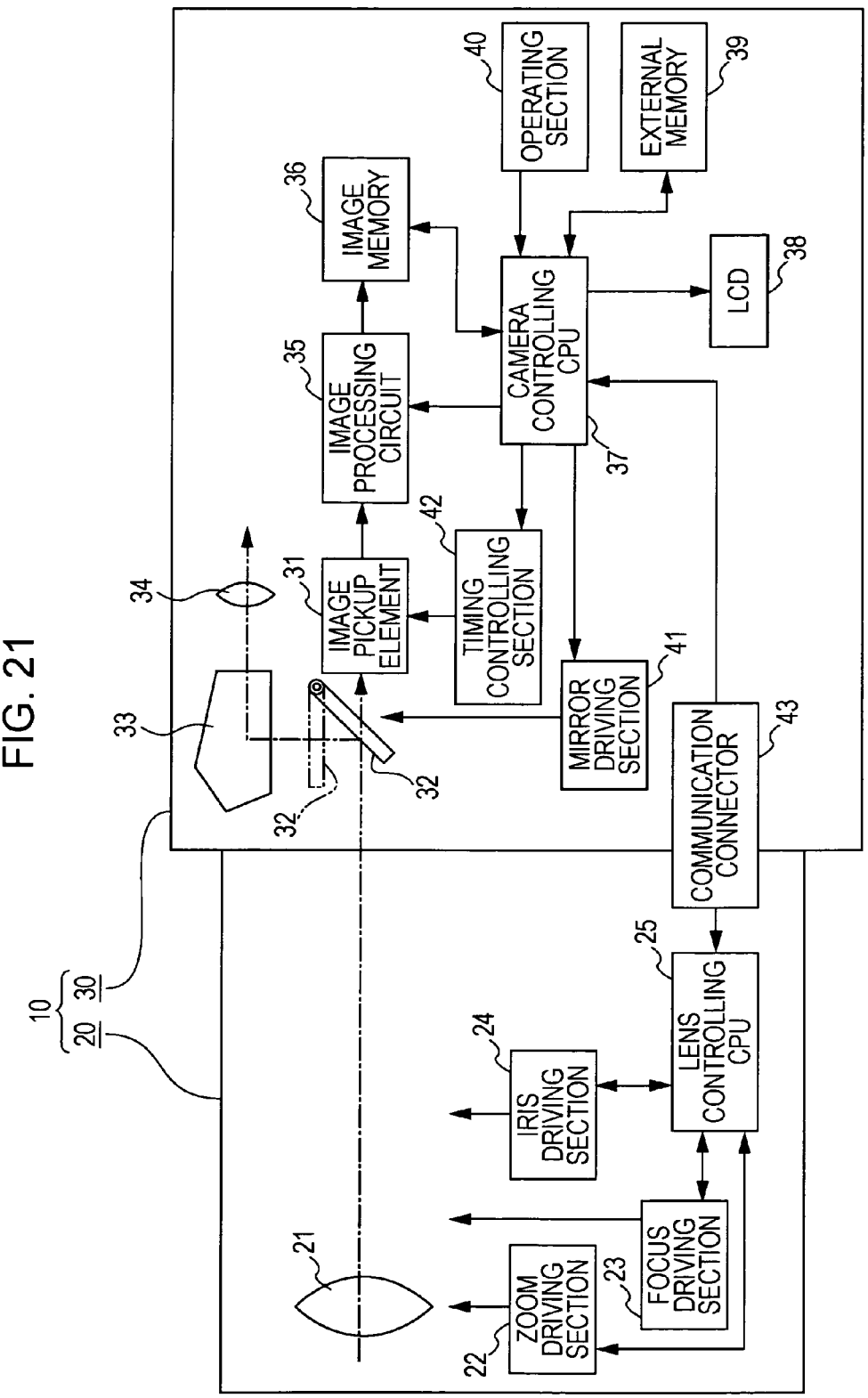
FIG. 21 is a block diagram of an image pickup device according to an embodiment of the present invention.

FIG. 21 schematically shows the structure of a digital still camera which is an example of the image pickup device according to the embodiment of the present invention.

An image pickup device (digital still camera) 10 is formed as what is called a single-lens reflex camera of a lens interchanging type, and is used by mounting a lens group 20 to a camera body 30.

The lens group 20 includes a zoom lens 21, a driving unit that drives the zoom lens 21, and a controlling unit that controls the driving unit. As the zoom lens 21, any one of the above-described zoom lenses 1 to 5, or any of the numerical examples of the zoom lenses 1 to 5 is used.

The driving unit of the lens group 20 is provided with driving sections, such as a zoom driving section 22 that moves both first and second lens groups during zooming, a focus driving section 23 that moves the first lens group during focusing, and an iris driving section 24 that changes an opening diameter of an aperture stop.

The controlling unit of the lens group 20 is provided with, for example, a lens control central processing unit (CPU) 25 that controls each driving section.

The camera body 30 is provided with an image pickup element 31 and a quick return mirror 32. The image pickup element 31 converts an optical image formed at the zoom lens 21 into an electrical signal. The quick return mirror 32 is disposed at the object side of the image pickup element 31. A penta prism 33 and an eyepiece 34 are disposed at the camera body 30.

In the camera body 30, a portion of light that is received through the zoom lens 21 is guided to the penta prism 33 by the quick return mirror 32, and is guided to the eyepiece 34 from the penta prism 33. A photographer can visually recognize an optical image formed at the zoom lens 21 through the eyepiece 34.

As the image pickup element 31, for example, a charge coupled device (CCD) or a complementary metal-oxide semiconductor (CMOS) is used. An electrical image signal output from the image pickup element 31 is subjected to various processing operations by an image processing circuit 35, and then to data compression by a predetermined method. As image data, the compressed data is temporarily stored in an image memory 36.

A camera control central processing unit (CPU) 37 functions to control the entire camera body 30 and the lens group 20. The camera control CPU 37 takes out the image data temporarily stored in the image memory 36, causes the image data to be displayed on a liquid crystal display device 38, and causes the image data to be stored in an external memory 39. In addition, the camera control CPU 37 reads out the image data stored in the external memory 39, and displays it on the liquid crystal display device 38.

The camera control CPU 37 also controls each section on the basis of a signal input from an operating unit 40, such as a shutter release switch or a zooming switch. For example, when the shutter release switch is operated, a command signal is output from the camera control CPU 37 to a mirror driving unit 41 and a timing controlling unit 42 on the basis of a signal input from the shutter release switch. When the command signal is input to the mirror driving unit 41 and the timing controlling unit 42, the quick return mirror 32 is moved upward by the mirror driving unit 41 as shown by an alternate long and two short dash line. A light beam is input to the image pickup element 31 from the zoom lens 21, and a timing in which a signal of the image pickup element 31 is read out is controlled by the timing controlling unit 42.

The lens group 20 and the camera body 30 are connected to each other by a communication connector 43. A signal regarding control of the zoom lens 21, such as an autofocus (AF) signal, an auto exposure (AE) signal, or a zooming signal is sent out from the camera control CPU 37 to the lens control central processing unit (CPU) 25 through the communication connector 43. The lens control CPU 25 controls the zoom driving section 22, the focus driving section 23, and the iris driving section 24, so that the state of the zoom lens 21 is changed to a predetermined state.

The present application contains subject matter related to that disclosed in Japanese Priority Patent Application JP 2008-137105 filed in the Japan Patent Office on May 26, 2008, the entire content of which is hereby incorporated by reference.

The numerical values and the forms of the respective sections in the embodiments are only specific practical forms for carrying out the present invention. They are not to be interpreted as limiting the technical scope of the present invention.

What is claimed is:

1. A zoom lens comprising:
   a first lens group having a negative refractive power; and
   a second lens group having a positive refractive power,
   wherein the first lens group and the second lens group are disposed in that order from an object side to an image side,
   wherein, when magnification is changed between a wide-angle end and a telephoto end, the first lens group and the second lens group are moved in a direction of an optical axis,
   wherein the first lens group and the second lens group each include at least one plastic aspherical lens, and
   wherein the zoom lens satisfies the following Conditional Expressions (1) and (2), $$0.40 < fw/bkw < 0.60 \tag{1}$$

$$0.01 < |(X1-X0)/h0| < 0.022 \tag{2}$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

2. The zoom lens according to claim 1, wherein the first lens group includes a first lens having a negative refractive power, a second lens having a negative refractive power and being the plastic aspherical lens, and a third lens having a positive refractive power,
   wherein the first lens, the second lens, and the third lens are disposed in that order from the object side to the image side, and
   wherein the zoom lens satisfies the following Conditional Expressions (3), (4), and (5), $$0.02 < |(X3-X2)/h1| < 0.12 \tag{3}$$

$$-2.0 < f1/fw < -1.7 \tag{4}$$

$$2.3 < fasp1/f1 < 2.8 \tag{5}$$

where X3 represents an air gap at an effective diameter position of an object-side surface of the second lens and the first lens; X2 represents an on-axis air gap at the first lens and the second lens; f1 represents a focal length of the first lens group; h1 represents an effective radius of the object-side surface of the plastic aspherical lens of the first lens group, and fasp1 represents a paraxial focal length of the plastic aspherical lens of the first lens group.

3. The zoom lens according to claim 2, wherein at least an image side surface of the at least one plastic aspherical lens of the first lens group is an aspherical surface, and
   wherein the image-side aspherical surface of the at least one plastic aspherical lens of the first lens group satisfies the following Conditional Expression (6), $$-1.2 < \kappa < -0.6 \tag{6}$$

where κ represents a conic constant in the following Numerical Expression (1), $$x = \frac{ch^2}{1 + \sqrt{1-(1+\kappa)c^2h^2}} + \sum_{i=2}^{16} A_i h^i$$

where x represents a distance from a vertex of the lens surface in the direction of the optical axis, h represents a height in a direction perpendicular to the optical axis, c represents a paraxial curvature at the vertex of the lens surface, and Ai represents a first-order aspherical coefficient.

4. The zoom lens according to claim 3, wherein the second lens group includes a cemented lens having a positive refractive power and the at least one plastic aspherical lens having a positive refractive power, and
   wherein the zoom lens satisfies the following Conditional Expression (7), $$\Delta v < 25 \tag{7}$$

where Δv represents a difference between Abbe numbers in the cemented lens.

5. The zoom lens according to claim 4, wherein the at least one plastic aspherical lens of the second lens group satisfies the following Conditional Expressions (8) and (9), $$2.5 < |fasp2/f2| < 35 \tag{8}$$

$$|(X5-X4)/h2| < 0.26 \tag{9}$$

where fasp2 represents a paraxial focal length of the plastic aspherical lens of the second lens group, f2 represents a focal length of the second lens group, X5 represents a thickness at an image-side effective diameter position of the plastic aspherical lens of the second lens group, X4 represents a thickness at the center of the plastic aspherical lens of the second lens group, and h2 represents an image-side effective radius of the plastic aspherical lens of the second lens group.

6. The zoom lens according to claim 5, wherein focusing is performed by moving the first lens group in the direction of the optical axis.

7. The zoom lens according to claim 6, further comprising an aperture stop disposed in the second lens group.

8. The zoom lens according to claim 7, further comprising a light-shielding member for restricting flare disposed at an object-side surface of the second lens group.

9. An image pickup device comprising:

a zoom lens; and an image pickup element that converts an optical image formed by the zoom lens into an electrical signal, wherein the zoom lens includes a first lens group having a negative refractive power and a second lens group having a positive refractive power, wherein the first lens group and the second lens group are disposed in that order from an object side to an image side, wherein, when magnification is changed between a wide-angle end and a telephoto end, the first lens group and the second lens group are moved in a direction of an optical axis, wherein the first lens group and the second lens group each include at least one plastic aspherical lens, and wherein the zoom lens satisfies the following Conditional Expressions (1) and (2), $$0.40 < fw/bkw < 0.60 \quad (1)$$

$$0.01 < |(X1-X0)/h0| < 0.022 \quad (2)$$

where fw represents a focal length of the entire zoom lens which is in focus at infinity in a wide-angle end state; bkw represents back focus when the entire zoom lens is in focus at infinity in the wide-angle end state; X1 represents a thickness at an image-side effective diameter position of the plastic aspherical lens of the first lens group; X0 represents a thickness at the center of the plastic aspherical lens of the first lens group; and h0 represents an image-side effective radius of the plastic aspherical lens of the first lens group.

* * * * *